United States Patent
Noh et al.

(10) Patent No.: US 12,557,144 B2
(45) Date of Patent: Feb. 17, 2026

(54) METHOD AND DEVICE FOR TRANSMITTING SIGNAL IN WIRELESS COMMUNICATION SYSTEM

(71) Applicant: WILUS INSTITUTE OF STANDARDS AND TECHNOLOGY INC., Gyeonggi-do (KR)

(72) Inventors: Minseok Noh, Gyeonggi-do (KR); Geunyoung Seok, Gyeonggi-do (KR); Youngjoon Yoon, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 19/052,174

(22) Filed: Feb. 12, 2025

(65) Prior Publication Data

US 2025/0185068 A1    Jun. 5, 2025

Related U.S. Application Data

(63) Continuation of application No. PCT/KR2023/011980, filed on Aug. 11, 2023.

(30) Foreign Application Priority Data

Aug. 12, 2022  (KR) .......... 10-2022-0101124
Aug. 12, 2022  (KR) .......... 10-2022-0101657
Nov. 7, 2022   (KR) .......... 10-2022-0147233

(51) Int. Cl.
*H04W 74/0816*   (2024.01)
*H04W 74/00*     (2009.01)
*H04W 92/18*     (2009.01)

(52) U.S. Cl.
CPC ..... *H04W 74/0816* (2013.01); *H04W 74/002* (2013.01); *H04W 92/18* (2013.01)

(58) Field of Classification Search
CPC ........... H04W 74/0816; H04W 74/002; H04W 92/18; H04W 72/25; H04W 16/14; H04W 72/40
See application file for complete search history.

(56) References Cited

U.S. PATENT DOCUMENTS

2021/0092783 A1   3/2021  Sun et al.
2022/0095117 A1*  3/2022  Liu ............. H04W 16/14
(Continued)

FOREIGN PATENT DOCUMENTS

CN    115553024      12/2022
WO    2021/040370    3/2021
(Continued)

OTHER PUBLICATIONS

International Search Report for PCT/KR2023/011980 mailed on Nov. 16, 2023 and its English translation from WIPO (published as WO2024/035226).
(Continued)

*Primary Examiner* — Liton Miah
(74) *Attorney, Agent, or Firm* — WOMBLE BOND DICKINSON (US) LLP

(57) ABSTRACT

The present invention relates to a wireless communication system and, particularly, to a method and a wireless device therefor, the method comprising the steps of: receiving, from a first UE, SCI including CO sharing information; receiving, from the first UE, in an RB set, a PSSCH corresponding to the SCI; and attempting SL transmission after the reception of the PSSCH, wherein, if a condition is satisfied, the SL transmission is attempted according to a CAP based on a fixed sensing period.

14 Claims, 24 Drawing Sheets

(56) References Cited

U.S. PATENT DOCUMENTS

| | | | |
|---|---|---|---|
| 2023/0319817 A1* | 10/2023 | Park | ............... H04W 74/0808 |
| | | | 370/329 |
| 2023/0354429 A1 | 11/2023 | Niu et al. | |
| 2024/0306198 A1 | 9/2024 | Yu et al. | |
| 2025/0048391 A1* | 2/2025 | Park | ............... H04W 72/25 |
| 2025/0056607 A1* | 2/2025 | Ko | ............... H04W 72/25 |
| 2025/0106889 A1* | 3/2025 | Park | ............... H04W 76/14 |
| 2025/0203634 A1* | 6/2025 | Park | ............... H04W 72/25 |

FOREIGN PATENT DOCUMENTS

| | | |
|---|---|---|
| WO | 2021/121705 | 6/2021 |
| WO | 2022/089718 | 5/2022 |
| WO | 2024/035226 | 2/2024 |

OTHER PUBLICATIONS

Written Opinion of the International Searching Authority for PCT/KR2023/011980 mailed on Nov. 16, 2023 and its English translation by Google Translate (published as WO2024/035226).

Moderator (OPPO): "FL summary #2 for AI 9.4.1.1: SL-U channel access mechanism", 3GPP TSG RAN WG1 #109-e, R1-2205181, e-Meeting, May 17, 2022, pp. 1-68.

* cited by examiner

METHOD AND DEVICE FOR TRANSMITTING SIGNAL IN WIRELESS COMMUNICATION SYSTEM

TECHNICAL FIELD

The present invention relates to a wireless communication system. Specifically, the present invention relates to a channel access method and a device using the same in a wireless communication system.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

A sidelink (SL) refers to a communication scheme in which a direct link is established between user equipments (UEs), and the UEs exchange voice or data directly with each other without intervention of a base station (BS). SL is considered as a solution of relieving the burden of the base station due to the rapidly increasing data traffic.

Vehicle-to-everything (V2X) refers to a communication technology that exchanges information with other vehicles, pedestrians, and infrastructure-built objects through wired/wireless communication. V2X may be divided into four types such as, vehicle-to-vehicle (V2V), vehicle-to-infrastructure (V21), vehicle-to-network (V2N), and vehicle-to-pedestrian (V2P). V2X communication may be provided through a PC5 interface and/or a Uu interface.

As more communication devices require larger communication capacities, there is a need for mobile broadband communication improved from the legacy radio access technology (RAT). Accordingly, communication systems considering services or UEs sensitive to reliability and latency are under discussion. A next-generation radio access technology in consideration of enhanced mobile broadband communication, massive MTC, ultra-reliable and low latency communication (URLLC), etc. may be referred to as new radio access technology (RAT) or new radio (NR). Even in NR, vehicle-to-everything (V2X) communication may be supported.

Meanwhile, in case of SL communications involving services with high reliability requirements or services with relatively high reliability requirements, for example, the SL HARQ feedback operation and/or mechanism of the UE may be useful.

DISCLOSURE OF INVENTION

Technical Problem

The disclosure is to provide a method for efficiently transmitting a signal in a wireless communication system and a device using the same. Specifically, the disclosure is to provide a channel access method for efficiently performing transmission in a wireless communication system and a device using the same.

Solution to Problem

According to an aspect of the disclosure, there is provided a user equipment (UE) used in a wireless communication system including a communication module and a processor configured to control the communication module, wherein the processor is configured to receive sidelink control information (SCI) including channel occupancy (CO) sharing information from a first UE, receive a physical sidelink shared channel (PSSCH) corresponding to the SCI from the first UE within a resource block (RB) set, and attempt transmission of sidelink (SL) transmission after receiving the PSCCH, and the transmission of the SL transmission is attempted according to a channel access procedure (CAP) based on a fixed sensing period when a condition including at least the following is satisfied: the SL transmission existing within a CO sharing period based on the CO sharing information; the SL transmission existing within the RB set; and the SL transmission including transmission for the first UE.

According to another aspect of the disclosure, there is provided a method used by a user equipment (UE) in a wireless communication system, the method including: receiving sidelink control information (SCI) including channel occupancy (CO) sharing information from a first UE; receiving a physical sidelink shared channel (PSSCH) corresponding to the SCI from the first UE within a resource block (RB) set; and attempting transmission of sidelink (SL) transmission after receiving the PSCCH, wherein the transmission of the SL transmission is attempted according to a channel access procedure (CAP) based on a fixed sensing period when a condition including at least the following is satisfied: the SL transmission existing within a CO sharing period based on the CO sharing information; the SL transmission existing within the RB set; and the SL transmission including transmission for the first UE.

Preferably, when the condition is satisfied, the transmission of the SL transmission may be attempted according to the CAP based on the fixed sensing period instead of a CAP based on random backoff.

Preferably, when the condition is satisfied, the transmission of the SL transmission may be attempted based on a gap between the PSSCH and the SL transmission according to a CAP as follows: a CAP based on a fixed sensing period of 25 µs when the gap is at least 25 µs; a CAP based on a fixed sensing period of 16 µs when the gap is 16 µs; and a CAP without channel sensing when the gap is less than 16 µs.

Preferably, the SL transmission may include physical sidelink control channel (PSCCH)/PSSCH transmission.

Preferably, the SL transmission may include physical sidelink feedback channel (PSFCH) transmission.

Preferably, when the condition is not satisfied, the transmission of the SL transmission may be attempted according to a CAP based on random backoff.

Preferably, the wireless communication system may include a Third-Generation Partnership Project (3GPP) new radio (NR)-based wireless communication system.

Advantageous Effects of Invention

The disclosure provides a method for efficiently transmitting a signal in a wireless communication system and a device using the same. In addition, the disclosure provides a channel access method for efficiently performing transmission in a wireless communication system and a device using the same.

The effects obtainable from the disclosure are not limited to the effects mentioned above, and other effects not mentioned will be clearly understood by those skilled in the art to which the disclosure belongs from the description below.

BEST MODE FOR CARRYING OUT THE INVENTION

Figure 1:
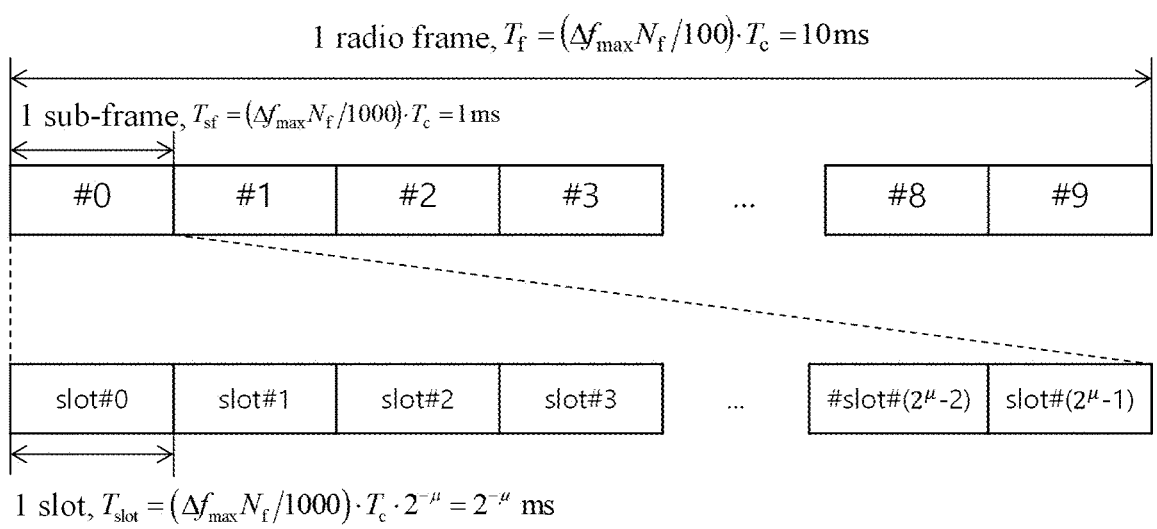
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f / 100$)*$T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and p can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include 21 slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
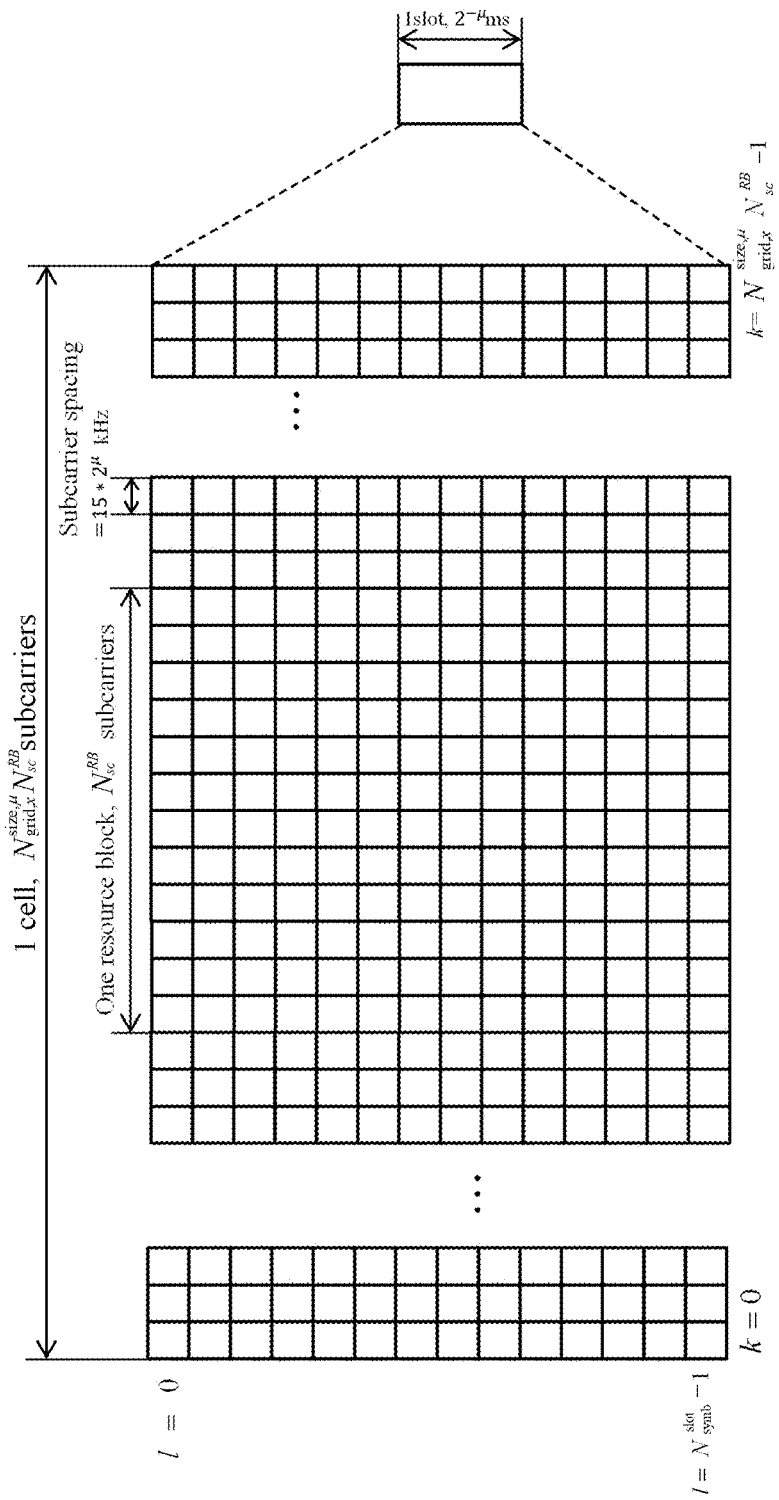
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent p (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$(e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x} * N^{RB}_{sc}-1$ in the frequency domain, and 1 may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal cannot change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | | | Symbol number in a slot | | | | | | | | | | | | | |
|---|---|---|---|---|---|---|---|---|---|---|---|---|---|---|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 | index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | 28 | D | D | D | D | D | D | D | D | D | D | D | D | X | U |
| 1 | U | U | U | U | U | U | U | U | U | U | U | U | U | U | 29 | D | D | D | D | D | D | D | D | D | D | D | X | X | U |
| 2 | X | X | X | X | X | X | X | X | X | X | X | X | X | X | 30 | D | D | D | D | D | D | D | D | D | D | X | X | X | U |
| 3 | D | D | D | D | D | D | D | D | D | D | D | D | D | X | 31 | D | D | D | D | D | D | D | D | D | D | D | X | U | U |
| 4 | D | D | D | D | D | D | D | D | D | D | D | D | X | X | 32 | D | D | D | D | D | D | D | D | D | D | X | X | U | U |
| 5 | D | D | D | D | D | D | D | D | D | D | D | X | X | X | 33 | D | D | D | D | D | D | D | D | D | X | X | X | U | U |
| 6 | D | D | D | D | D | D | D | D | D | D | X | X | X | X | 34 | D | X | U | U | U | U | U | U | U | U | U | U | U | U |
| 7 | D | D | D | D | D | D | D | D | D | X | X | X | X | X | 35 | D | D | X | U | U | U | U | U | U | U | U | U | U | U |
| 8 | X | X | X | X | X | X | X | X | X | X | X | X | X | U | 36 | D | D | D | X | U | U | U | U | U | U | U | U | U | U |
| 9 | X | X | X | X | X | X | X | X | X | X | X | X | U | U | 37 | D | X | X | U | U | U | U | U | U | U | U | U | U | U |
| 10 | X | U | U | U | U | U | U | U | U | U | U | U | U | U | 38 | D | D | X | X | U | U | U | U | U | U | U | U | U | U |
| 11 | X | X | U | U | U | U | U | U | U | U | U | U | U | U | 39 | D | D | D | X | X | U | U | U | U | U | U | U | U | U |
| 12 | X | X | X | U | U | U | U | U | U | U | U | U | U | U | 40 | D | X | X | X | U | U | U | U | U | U | U | U | U | U |
| 13 | X | X | X | X | U | U | U | U | U | U | U | U | U | U | 41 | D | D | X | X | X | U | U | U | U | U | U | U | U | U |
| 14 | X | X | X | X | X | U | U | U | U | U | U | U | U | U | 42 | D | D | D | X | X | X | U | U | U | U | U | U | U | U |
| 15 | X | X | X | X | X | X | U | U | U | U | U | U | U | U | 43 | D | D | D | D | D | D | D | D | X | X | X | X | X | U |
| 16 | D | X | X | X | X | X | X | X | X | X | X | X | X | X | 44 | D | D | D | D | D | X | X | X | X | X | X | X | X | U |
| 17 | D | D | X | X | X | X | X | X | X | X | X | X | X | X | 45 | D | D | D | D | D | D | X | X | U | U | U | U | U | U |
| 18 | D | D | D | X | X | X | X | X | X | X | X | X | X | X | 46 | D | D | D | D | D | X | U | D | D | D | D | D | X | U |
| 19 | D | X | X | X | X | X | X | X | X | X | X | X | X | U | 47 | D | D | X | U | U | U | U | D | D | X | U | U | U | U |
| 20 | D | D | X | X | X | X | X | X | X | X | X | X | X | U | 48 | D | X | U | U | U | U | D | X | U | U | U | U | U | U |
| 21 | D | D | D | X | X | X | X | X | X | X | X | X | U | U | 49 | D | D | D | X | X | U | D | D | D | D | X | X | U | U |
| 22 | D | X | X | X | X | X | X | X | X | X | X | X | U | U | 50 | D | D | X | X | U | U | D | D | X | X | U | U | U | U |
| 23 | D | D | D | X | X | X | X | X | X | X | X | U | U | U | 51 | D | X | X | U | U | U | D | X | X | U | U | U | U | U |
| 24 | D | D | D | X | X | X | X | X | X | X | X | U | U | U | 52 | D | X | X | X | X | U | D | X | X | X | X | X | X | U |
| 25 | D | X | X | X | X | X | X | X | X | X | U | U | U | U | 53 | D | X | X | X | U | D | X | X | X | U | U | U | U | U |
| 26 | D | D | X | X | X | X | X | X | X | X | U | U | U | U | 54 | X | X | X | X | X | D | D | D | D | D | D | D | D | D |
| 27 | D | D | D | X | X | X | X | X | X | X | U | U | U | U | 55 | D | X | X | X | U | U | U | D | D | D | D | D | D | D |
| 56~255 | | | | | | | | | | | | | | | Reserved | | | | | | | | | | | | | | |

In Table 1, D denotes a DL symbol, U denotes a UL symbol, and X denotes a flexible symbol. As shown in Table 1, up to two DU UL switching in one slot may be allowed.

Figure 3:
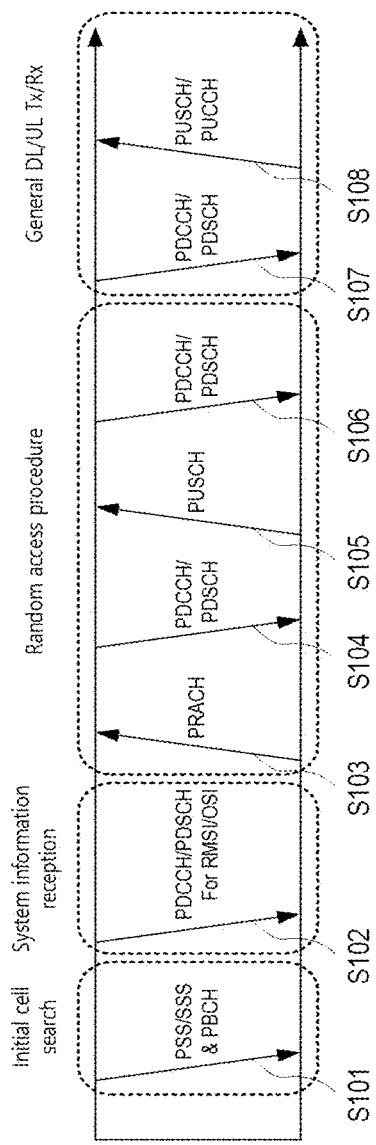
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S5101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DC may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
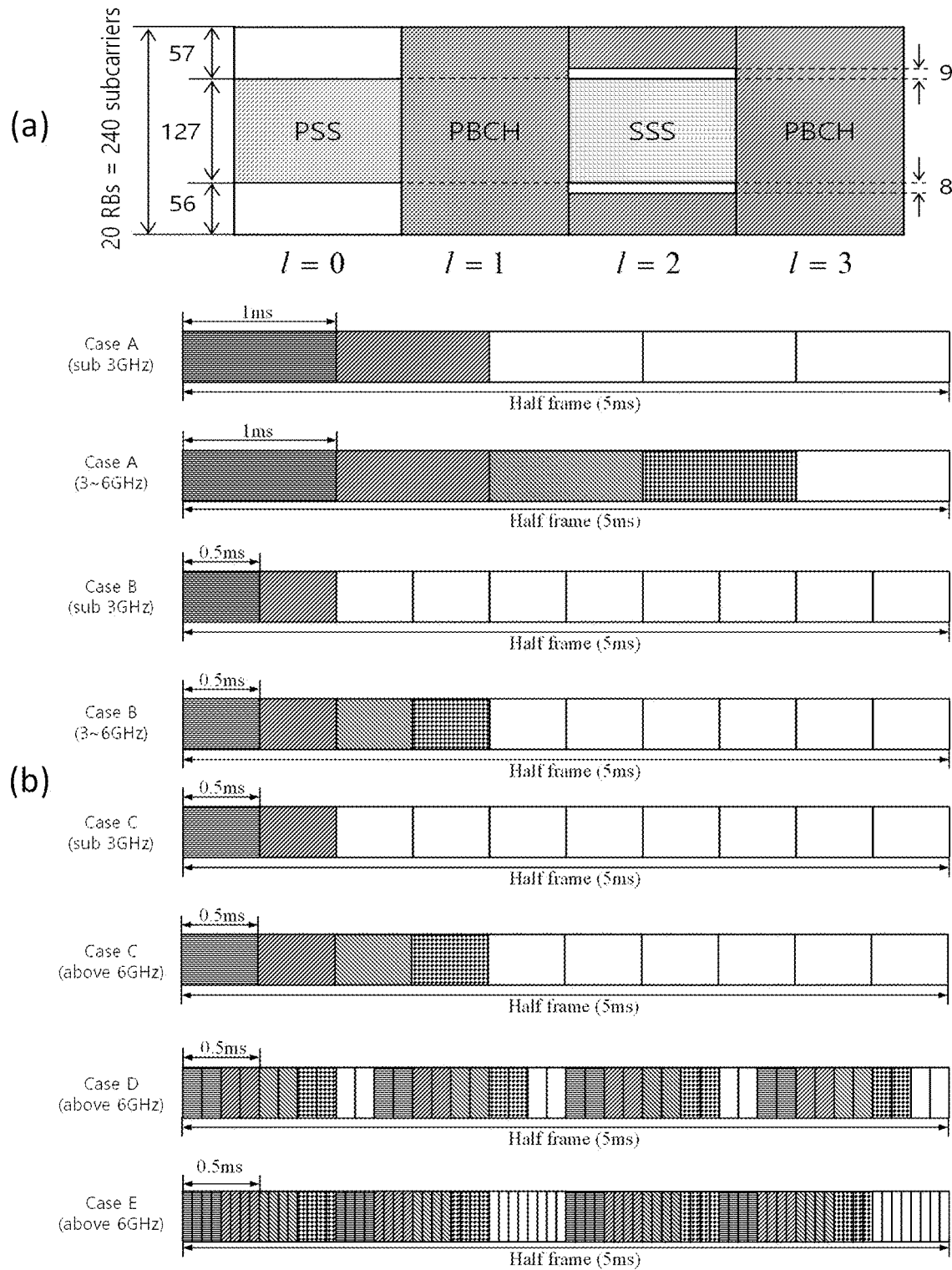
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

The SS allows a total of 1008 unique physical layer cell IDs to be grouped

| Channel or signal | OFDM symbol number 1 relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v | into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = (n + 43N^{(2)}_{ID})\bmod 127$$

$$0 \leq n < 127$$

Here, $x(i+7) = (x(i+4) + x(i))\bmod 2$ and is given as $$[x(6)\ x(5)\ x(4)\ x(3)\ x(2)\ x(1)\ x(0)] = [1\ 1\ 1\ 0\ 1\ 1\ 0]$$

Further, the sequence $d_{SSS}(n)$ of the SSS is as follows.

$$d_{SSS}(n) = [1 - 2x_0((n + m_0)\bmod 127)][1 - 2x_1((n + m_1)\bmod 127)]$$

$$m_0 = 15\left\lfloor\frac{N^{(1)}_{ID}}{112}\right\rfloor + 5N^{(2)}_{ID}$$

$$m_1 = N^{(1)}_{ID}\bmod 112$$

$$0 \leq n < 127$$

Here, $x_0(i+7) = (x_0(i+4) + x_0(i))\bmod 2$ $x_1(i+7) = (x_1(i+1) + x_1(i))\bmod 2$ and is given as $$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1]$$

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
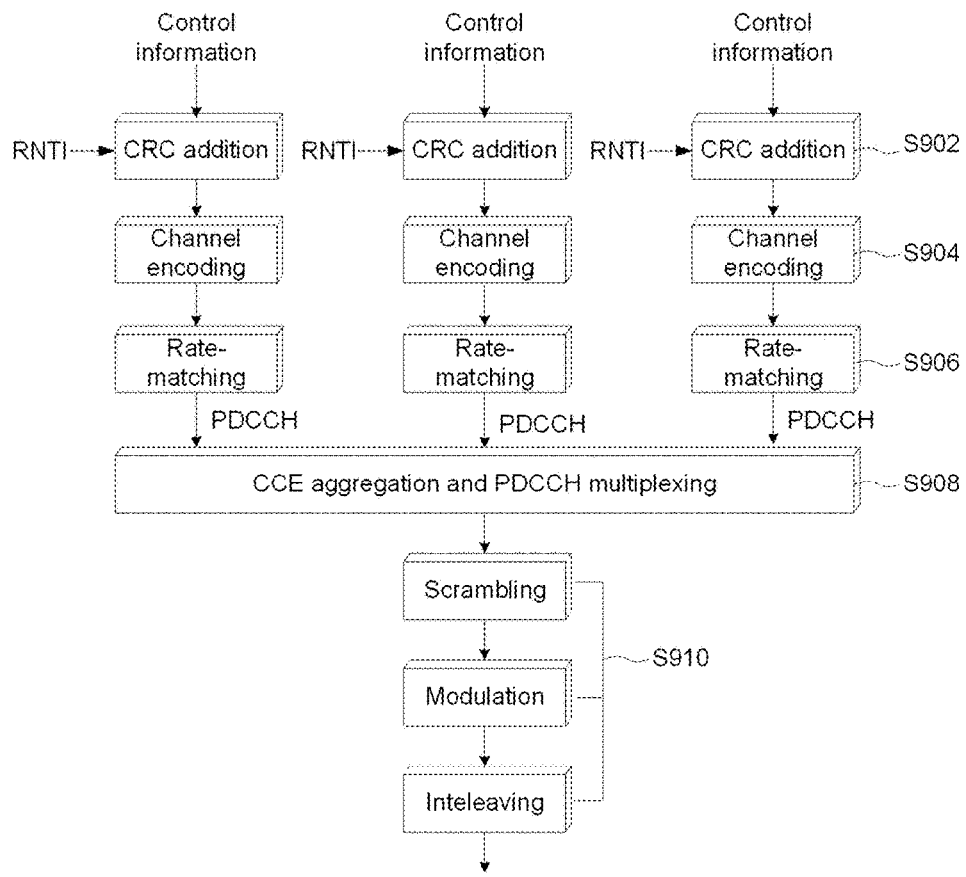
FIG. 5 illustrates a procedure for transmitting control information and a control channel in a 3GPP NR system.
Figure 5:
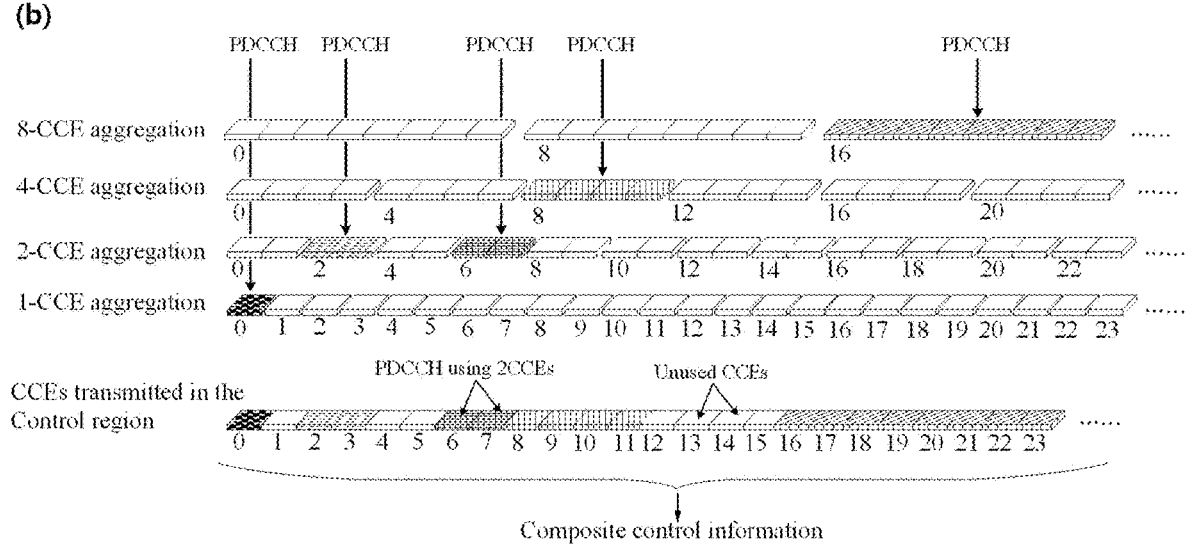

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
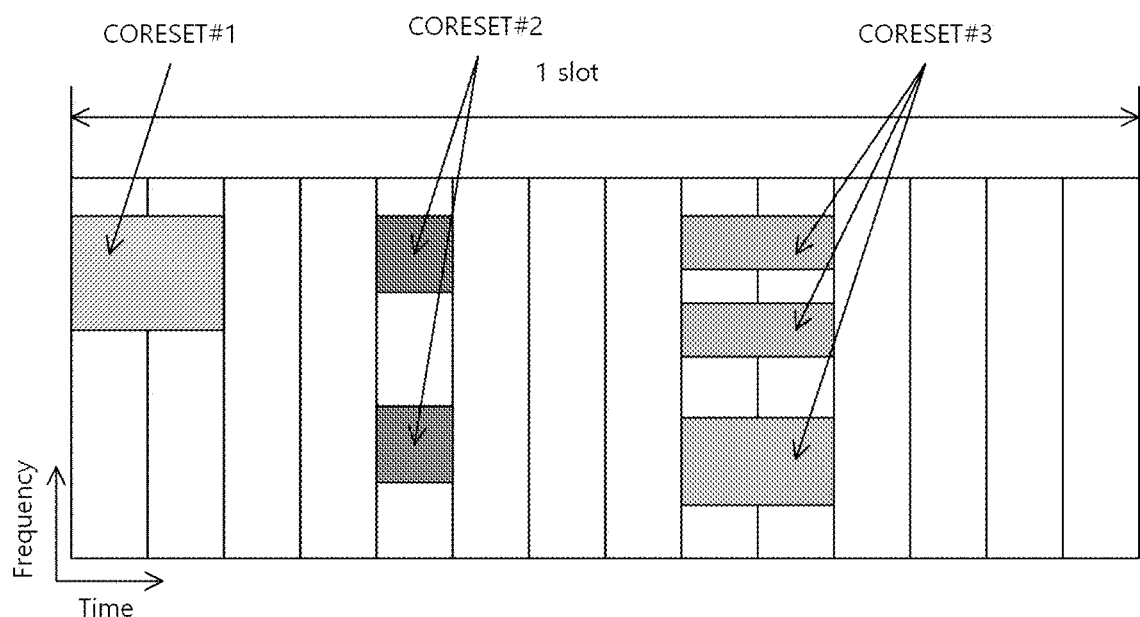
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
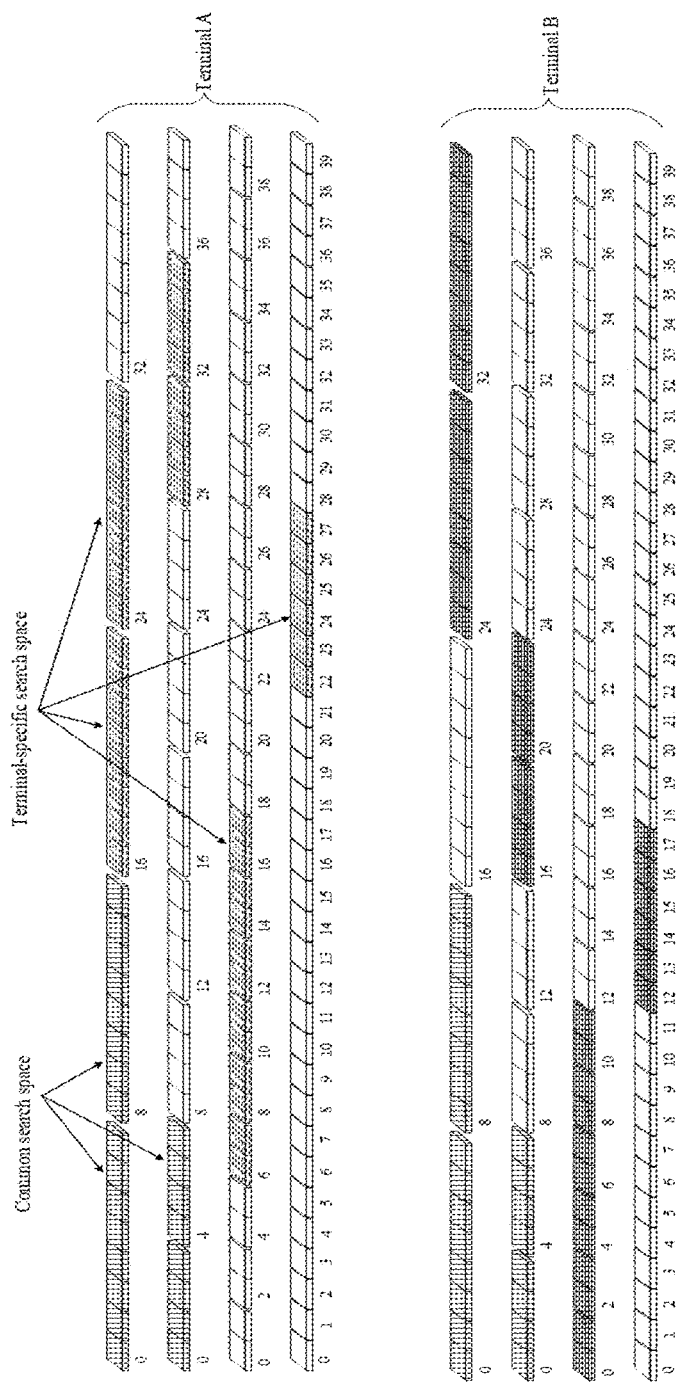
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| The PUCCH may be used to transmit the following UL control information | | |
|---|---|---|
| PUCCH format | Length in OFDM symbols | Number of bits |
| 0 | 1-2 | ≤2 |
| 1 | 4-14 | ≤2 |

TABLE 3-continued

| The PUCCH may be used to transmit the following UL control information | | |
|---|---|---|
| PUCCH format | Length in OFDM symbols | Number of bits |
| 2 | 1-2 | >2 |
| 3 | 4-14 | >2 |
| 4 | 4-14 | >2 |

(UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information successfully transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value ma according to $M_{bit}$ bit UCI ($M_{bit}$=1 or 2). In addition, the base sequence having the length of 12 may be transmitted by mapping a cyclic shifted sequence based on a predetermined CS value ma to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is Mbit=1, may be BPSK-modulated. The UE may modulate UCI, which is Mbit=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), ..., $d(M_{symbol}-1)$. Here, $M_{symbol}$ may be $M_{bit}/2$. Through this, the UE may obtain a frequency diversity gain. More specifically, $M_{bit}$ bit UCI ($M_{bit}>2$) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates Ma, bits UCI (Mbit>2) with π/2-Binary Phase Shift Keying (BPSK) or QPSK to generate a complex valued symbol d(0) to $d(M_{symb}-1)$. Here, when using π/2-BPSK, $M_{symb}=M_{bit}$, and when using QPSK, $M_{symb}=M_{bit}/2$. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DC for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DC for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
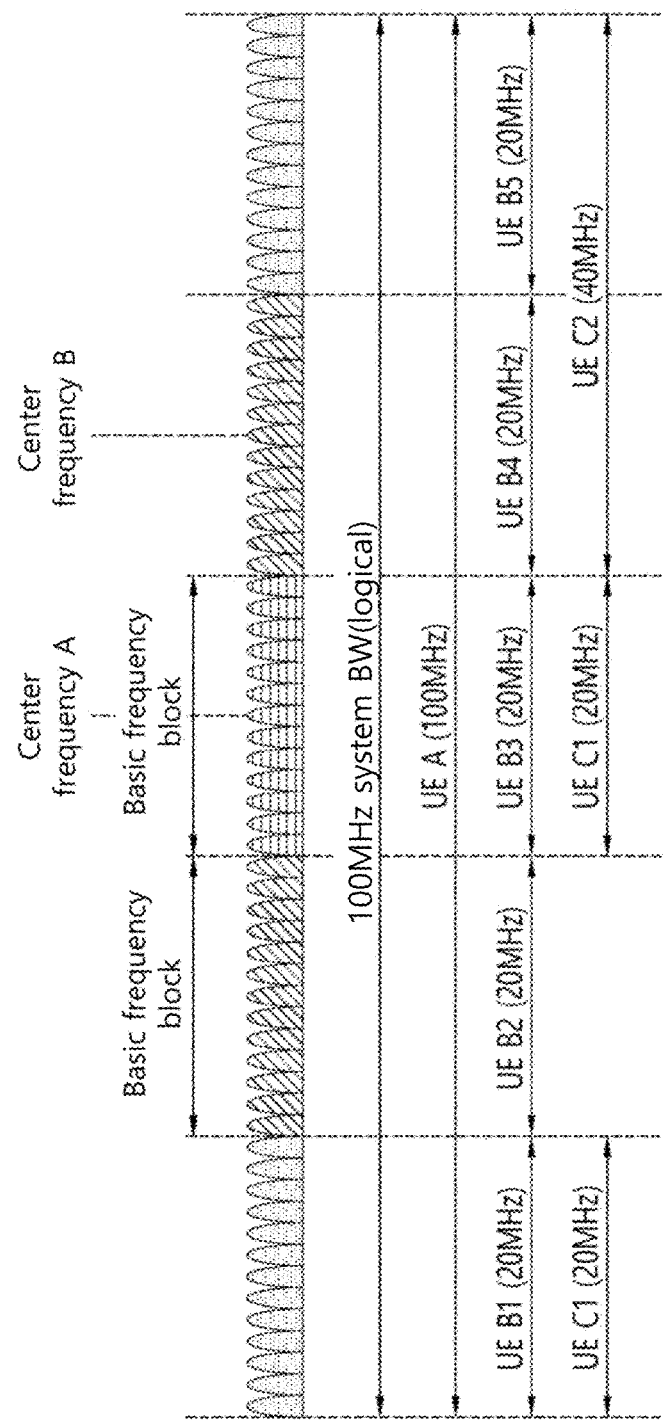
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell(SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs B1~B5 can use only a 20 MHz bandwidth and perform communication using one component carrier. UEs C1 and C2 may use a 40 MHz bandwidth and perform communication using two component carriers, respectively. The two component carriers may be logically/physically adjacent or non-adjacent. UE C1 represents the case of using two non-adjacent component carriers, and UE C2 represents the case of using two adjacent component carriers.

Figure 9:
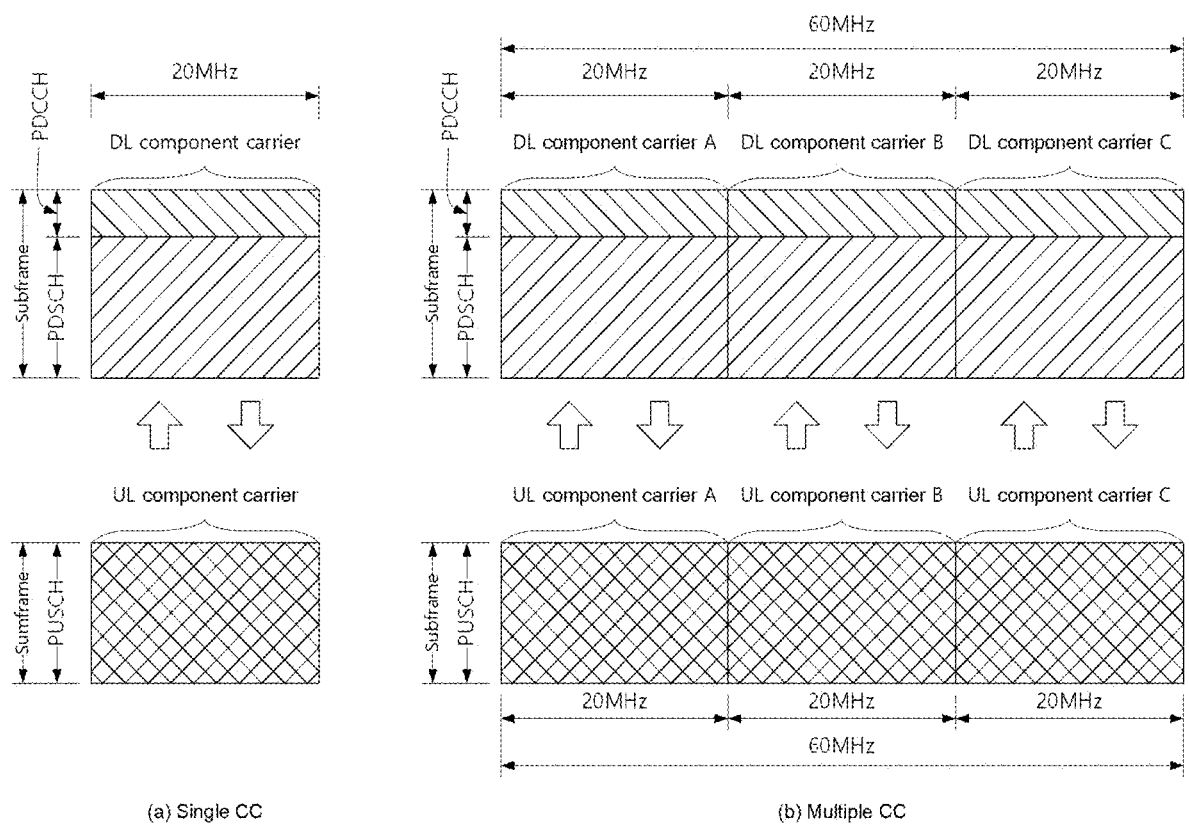
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
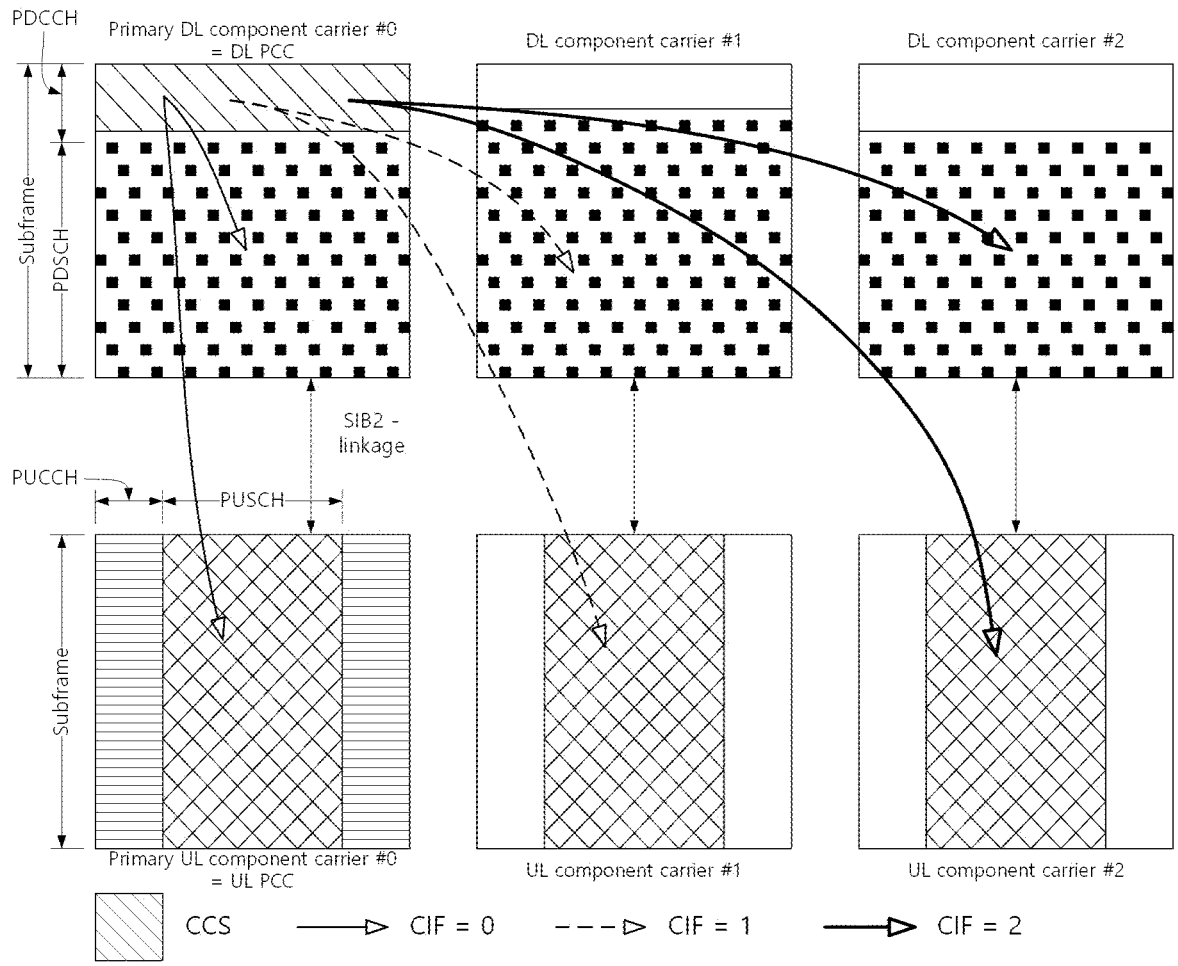
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

<Communication Method in Unlicensed Band>

Figure 11:
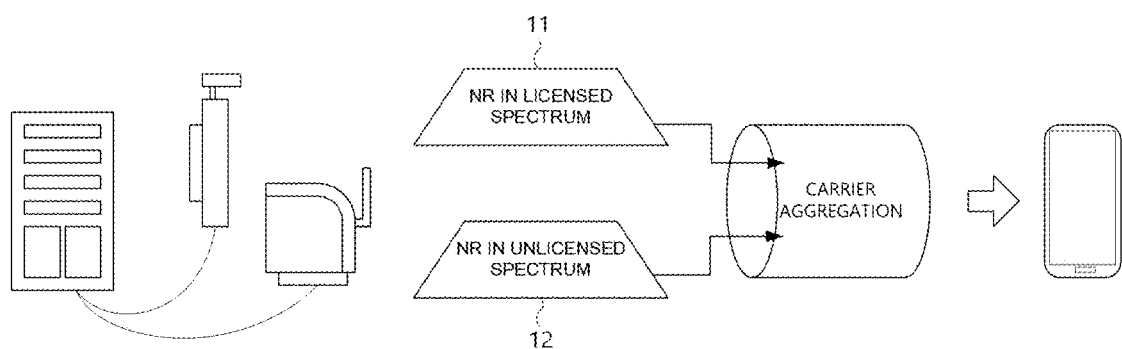
FIG. 11 illustrates a New Radio-Unlicensed (NR-U) service environment.

FIG. 11 illustrates a New Radio-Unlicensed (NR-U) service environment.

Referring to FIG. 11, a service environment in which NR technology 11 in the existing licensed band and NR-Unlicensed (NR-U), i.e., NR technology 12 in the unlicensed band may be provide to the user. For example, in the NR-U environment, NR technology 11 in the licensed band and the NR technology 21 in the unlicensed band may be integrated using technologies such as carrier aggregation which may contribute to network capacity expansion. In addition, in an asymmetric traffic structure with more downlink data than uplink data, NR-U can provide an NR service optimized for various needs or environments. For convenience, the NR technology in the licensed band is referred to as NR-L (NR-Licensed), and the NR technology in the unlicensed band is referred to as NR-U (NR-Unlicensed).

Figure 12:
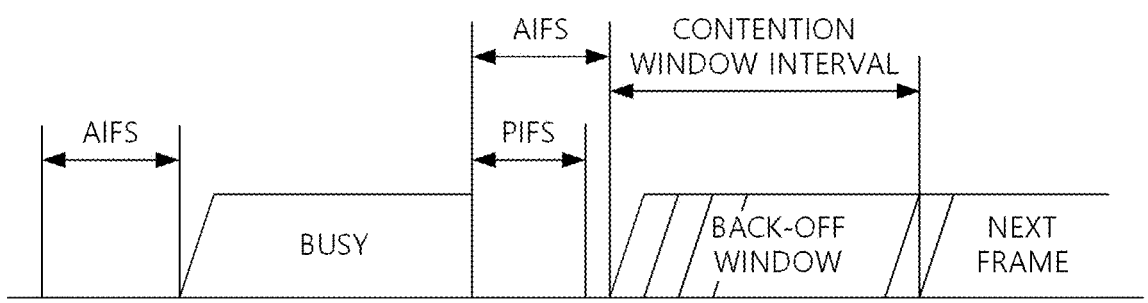
FIG. 12 illustrates a communication method (e.g., wireless LAN) operating in an existing unlicensed band.

FIG. 12 illustrates a conventional communication scheme (e.g., wireless LAN) operating in an unlicensed band. Since most devices that operate in the unlicensed band operate based on listen-before-talk (LBT), a clear channel assessment (CCA) technique that senses a channel before data transmission is performed.

Referring to FIG. 12, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a backoff procedure after a defer duration (e.g., arbitration interframe space (AIFS), PCF IFS (PIFS), or the like). The defer duration represents a minimum time when the terminal needs to wait after the channel is idle. The backoff procedure allows the terminal to further wait for a predetermined time after the defer duration. For example, the terminal stands by while decreasing a slot time for slot times corresponding to a random number allocated to the terminal in the contention window (CW) during the channel is idle, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the backoff procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since the existing communication in the unlicensed band mostly operates based on LBT, a channel access in the NR-U system also performs LBT for coexistence with existing devices. Specifically, the channel access method on the unlicensed band in the NR may be classified into the following four categories according to the presence/absence of LBT/application method.

Category 1: No LBT
 The Tx entity does not perform the LBT procedure for transmission.

Category 2: LBT without Random Backoff
 The Tx entity senses whether a channel is idle during a first interval without random backoff to perform a transmission. That is, the Tx entity may perform a transmission through the channel immediately after the channel is sensed to be idle during the first interval. The first interval is an interval of a predetermined length immediately before the Tx entity performs the transmission. According to an embodiment, the first interval may be an interval of 25 µs length, but the present invention is not limited thereto.

Category 3: LBT Performing Random Backoff Using CW of Fixed Size
 The Tx entity obtains a random value within the CW of the fixed size, sets it to an initial value of a backoff counter (or backoff timer) N, and performs backoff by using the set backoff counter N. That is, in the backoff procedure, the Tx entity decreases the backoff counter by 1 whenever the channel is sensed to be idle for a predetermined slot period. Here, the predetermined slot period may be 9 µs, but the present invention is not limited thereto. The backoff counter N is decreased by 1 from the initial value, and when the value of the backoff counter N reaches 0, the Tx entity may perform the transmission. Meanwhile, in order to perform backoff, the Tx entity first senses whether the channel is idle during a second interval (that is, a defer duration Td). According to an embodiment of the present invention, the Tx entity may sense (determine) whether the channel is idle during the second interval, according to whether the channel is idle for at least some period (e.g., one slot period) within the second interval. The second interval may be set based on the channel access priority class of the Tx entity, and consists of a period of 16 µs and m consecutive slot periods. Here, m is a value set according to the channel access priority class. The Tx entity performs channel sensing to decrease the backoff counter when the channel is sensed to be idle during the second interval. On the other hand, when the channel is sensed to be busy during the backoff procedure, the backoff procedure is stopped. After stopping the backoff procedure, the Tx entity may resume backoff when the channel is sensed to be idle for an additional second interval. In this way, the Tx entity may perform the transmission when the channel is idle during the slot period of the backoff counter N, in addition to the second interval. In this case, the initial value of the backoff counter N is obtained within the CW of the fixed size.

Category 4: LBT Performing Random Backoff by Using CW of Variable Size
 The Tx entity obtains a random value within the CW of a variable size, sets the random value to an initial value of a backoff counter (or backoff timer) N, and performs backoff by using the set backoff counter N. More specifically, the Tx entity may adjust the size of the CW based on HARQ-ACK information for the previous transmission, and the initial value of the backoff counter N is obtained within the CW of the adjusted size. A specific process of performing backoff by the Tx entity is as described in Category 3. The Tx entity may perform the transmission when the channel is idle during the slot period of the backoff counter N, in addition to the second interval. In this case, the initial value of the backoff counter N is obtained within the CW of the variable size.

In the above Category 1 to Category 4, the Tx entity may be a base station or a UE. According to an embodiment of the present invention, a first type channel access may refer to a Category 4 channel access, and a second type channel access may refer to a Category 2 channel access.

Figure 13:
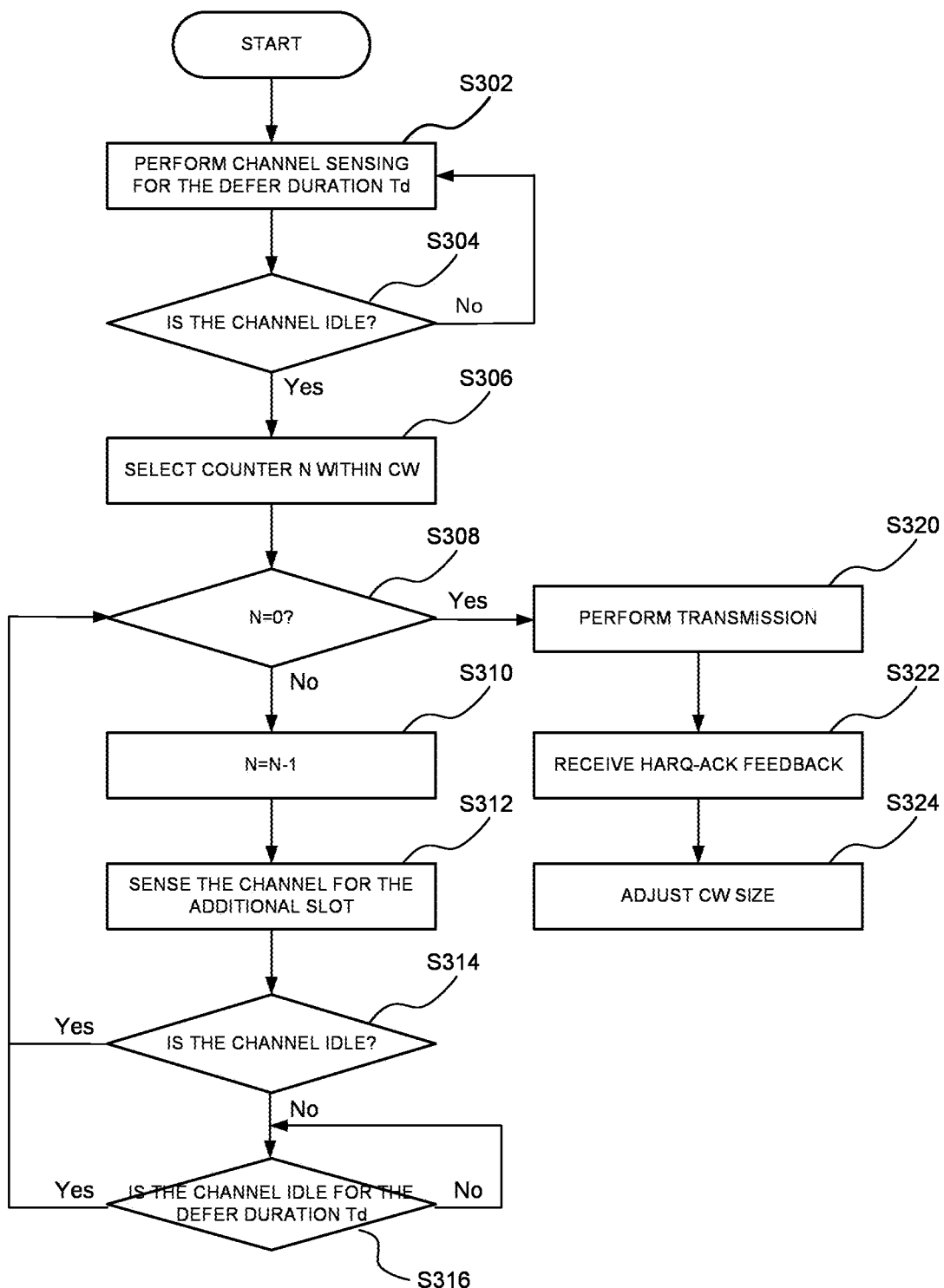
FIG. 13 illustrates a channel access procedure based on Category 4 LBT.

FIG. 13 illustrates a channel access procedure based on Category 4 LBT according to an embodiment of the present invention.

In order to perform the channel access, first, the Tx entity performs channel sensing for the defer duration Td (S302). According to an embodiment of the present invention, the channel sensing for a defer duration Td in step S302 may be performed through channel sensing for at least a portion of the defer duration Td. For example, the channel sensing for the defer duration Td may be performed through the channel sensing during one slot period within the defer duration Td. The Tx entity checks whether the channel is idle through the channel sensing for the defer duration Td (S304). If the channel is sensed to be idle for the defer duration Td, the Tx entity proceeds to step S306. If the channel is not sensed to be idle for the defer duration Td (that is, sensed to be busy), the Tx entity returns to step S302. The Tx entity repeats steps S302 to S304 until the channel is sensed to be idle for the defer duration Td. The defer duration Td may be set based on the channel access priority class of the Tx entity, and consists of a period of 16 μs and m consecutive slot periods. Here, m is a value set according to the channel access priority class.

Next, the Tx entity obtains a random value within a predetermined CW, sets the random value to the initial value of the backoff counter (or backoff timer) N (S306), and proceeds to step S308. The initial value of the backoff counter N is randomly selected from values between 0 and CW. The Tx entity performs the backoff procedure by using the set backoff counter N. That is, the Tx entity performs the backoff procedure by repeating S308 to S316 until the value of the backoff counter N reaches 0. Meanwhile, FIG. 13 illustrates that step S306 is performed after the channel is sensed to be idle for the defer duration Td, but the present invention is not limited thereto. That is, step S306 may be performed independently of steps S302 to S304, and may be performed prior to steps S302 to S304. When step S306 is performed prior to steps S302 to S304, if the channel is sensed to be idle for the defer duration Td by steps S302 to S304, the Tx entity proceeds to step S308.

In step S308, the Tx entity checks whether the value of the backoff counter N is 0. If the value of the backoff counter N is 0, the Tx entity proceeds to step S320 to perform a transmission. If the value of the backoff counter N is not 0, the Tx entity proceeds to step S310. In step S310, the Tx entity decreases the value of the backoff counter N by 1. According to an embodiment, the Tx entity may selectively decrease the value of the backoff counter by 1 in the channel sensing process for each slot. In this case, step S310 may be skipped at least once by the selection of the Tx entity. Next, the Tx entity performs channel sensing for an additional slot period (S312). The Tx entity checks whether the channel is idle through the channel sensing for the additional slot period (S314). If the channel is sensed to be idle for the additional slot period, the Tx entity returns to step S308. In this way, the Tx entity may decrease the backoff counter by 1 whenever the channel is sensed to be idle for a predetermined slot period. Here, the predetermined slot period may be 9 μs, but the present invention is not limited thereto.

In step S314, if the channel is not sensed to be idle for the additional slot period (that is, sensed to be busy), the Tx entity proceeds to step S316. In step S316, the Tx entity checks whether the channel is idle for the additional defer duration Td. According to an embodiment of the present invention, the channel sensing in step S316 may be performed in units of slots. That is, the Tx entity checks whether the channel is sensed to be idle during all slot periods of the additional defer duration Td. When the busy slot is detected within the additional defer duration Td, the Tx entity immediately restarts step S316. When the channel is sensed to be idle during all slot periods of the additional defer duration Td, the Tx entity returns to step S308.

On the other hand, if the value of the backoff counter N is 0 in the check of step S308, the Tx entity performs the transmission (S320). The Tx entity receives a HARQ-ACK feedback corresponding to the transmission (S322). The Tx entity may check whether the previous transmission is successful through the received HARQ-ACK feedback. Next, the Tx entity adjusts the CW size for the next transmission based on the received HARQ-ACK feedback (S324).

As described above, after the channel is sensed to be idle for the defer duration Td, the Tx entity may perform the transmission when the channel is idle for N additional slot periods. As described above, the Tx entity may be a base station or a UE, and the channel access procedure of FIG. 13 may be used for downlink transmission of the base station and/or uplink transmission of the UE.

Figure 14:
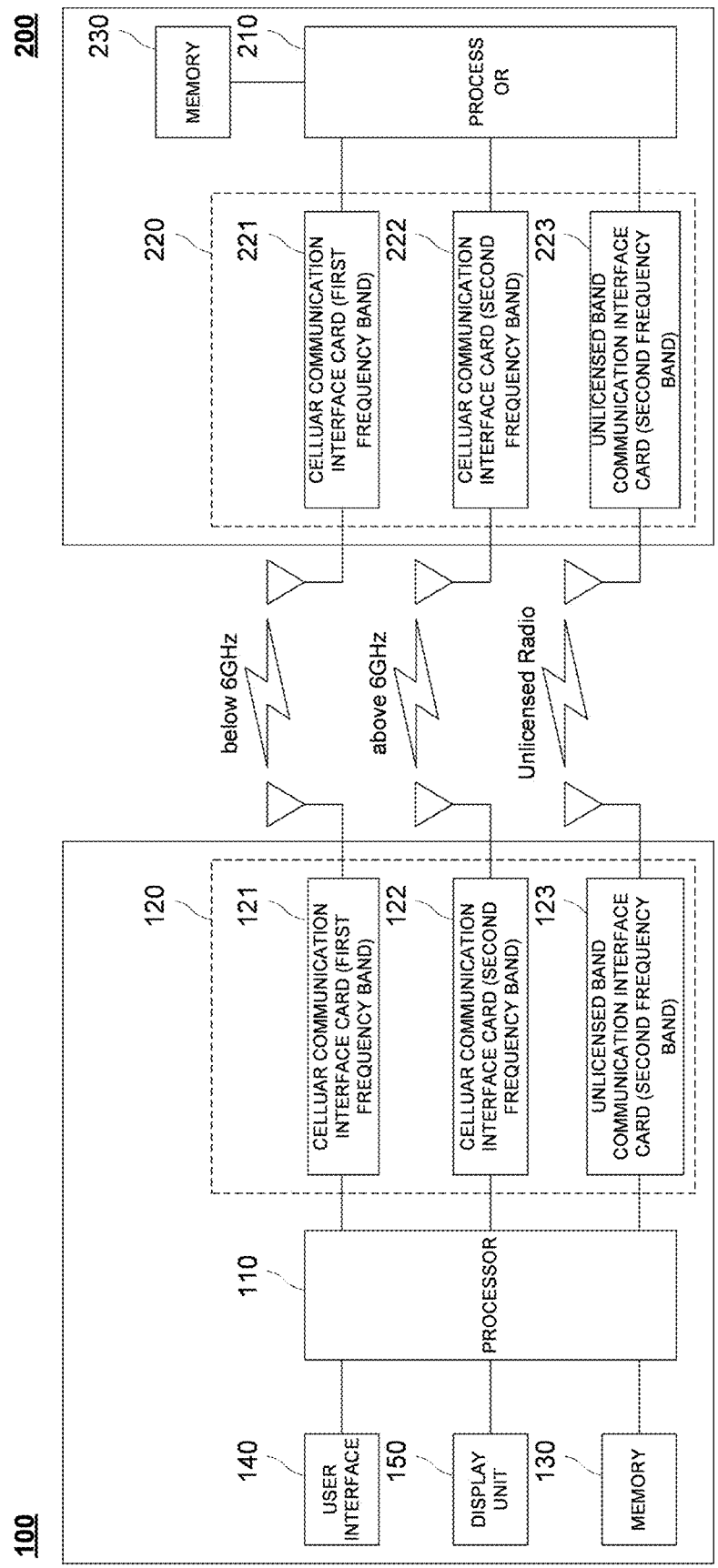
FIG. 14 is a block diagram illustrating configurations of a UE and a base station according to an embodiment of the present invention.

FIG. 14 is a block diagram showing the configurations of a UE and a base station according to an embodiment of the present invention. In an embodiment of the present invention, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present invention, the base station controls and manages a cell (e.g., a macro cell, a femto cell, a pico cell, etc.) corresponding to a service area, and performs functions of a signal transmission, a channel designation, a channel monitoring, a self-diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 100 may control the entire operation including each unit of the UE 100, and may control the transmission/reception of data between the units. Here, the processor 110 may be configured to perform an operation according to the embodiments described in the present invention. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present invention may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present invention. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHz, 6 GHz, 7 GHz or above 52.6 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 14 is a block diagram illustrating the UE 100 and the base station 200 according to an embodiment of the present invention, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

eters used for a channel access for each channel access priority class for the downlink transmission in the LTE LAA system.

When the downlink channel transmitted by the wireless communication device includes data traffic, the defer duration may be configured according to the channel access priority class of traffic included in the downlink channel. In addition, the defer duration may include an initial duration Tf or one or more (mp) slot durations Tsl. In this case, the slot duration Tsl may be 9 μs. The initial duration includes one idle slot duration Tsl. In addition, the number (mp) of slot durations included in the defer duration may be configured according to the above-described channel access priority class. Specifically, the number (mp) of slot durations included in the defer duration may be configured as shown in Table 4.

TABLE 4

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Figure 15:
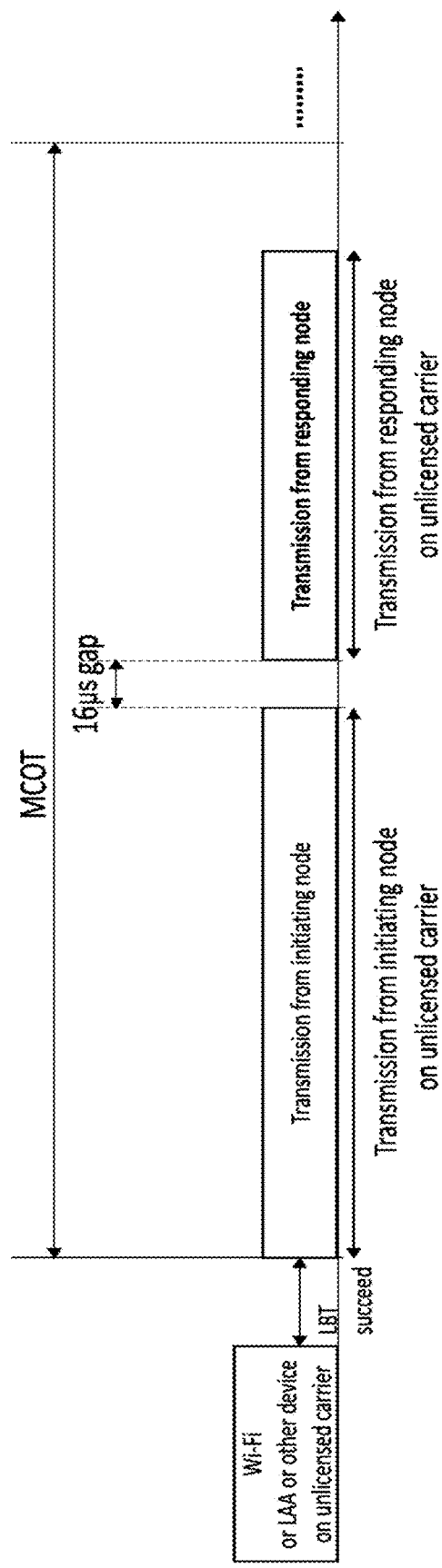
FIG. 15 illustrates an example of channel occupancy time (COT) configurations and a corresponding operation.

FIG. 15 illustrates a channel access procedure performed by a wireless communication device in an unlicensed band, and an LBT procedure used when a wireless communication device performs a channel access in an unlicensed band. In particular, a channel access in which the wireless communication device performs a transmission according to a result of channel sensing within a time interval of a predetermined duration may be configured in the wireless communication device. In this case, a method for operating a wireless communication device when the wireless communication device fails to access a channel will be described. The specified duration which has been mentioned earlier may be 16 μs.

For convenience of description, the wireless communication device, which is a wireless endpoint that initiates channel occupation, is referred to as an initiating node. In addition, a wireless communication device, which is a wireless endpoint communicating with the initiating node, is referred to as a responding node. The initiating node may be a base station and the responding node may be a UE. In addition, the initiating node may be a UE and the responding node may be a base station. When the initiating node intends to transmit data, the initiating node may perform a channel access according to a channel access priority class determined according to the type of data. In this case, a parameter used for a channel access may be determined according to the type of data. The parameters used for the channel access may include any one of the minimum value of the CW, the maximum value of the CW, the maximum occupancy time (MCOT), which is the maximum duration capable of occupying a channel in one channel occupancy, and the number (mp) of sensing slots. Specifically, the initiating node may perform the above-described Category 4 LBT according to the channel access priority class determined according to the type of data.

Table 4 below shows an example of values of parameters used for a channel access according to the channel access priority class. Specifically, Table 4 shows values of param- In addition, the wireless communication device may configure the range of the CW values according to the channel access priority class. Specifically, the wireless communication device may set the value of the CW to satisfy CWmin,p<=CW<=CWmax,p. In this case, the minimum value CWmin,p and the maximum value CWmax,p of the CW may be determined according to the channel access priority class. Specifically, the minimum value CWmin,p and the maximum value CWmax,p of the CW may be determined as shown in Table 4. The wireless communication device may set a minimum value CWmin,p and a maximum value CWmax,p of CW in a counter value setting procedure. When the wireless communication device accesses the channel, the wireless communication device may adjust the value of the CW as described above with reference to FIG. 13. In addition, in the wireless communication device of the unlicensed band, the MCOT Tmcot,p may be determined according to the channel access priority of data included in the transmission as described above. Specifically, the MCOT may be determined as shown in Table 4. Accordingly, the wireless communication device may not be allowed to perform continuous transmissions for a time exceeding the MCOT in the unlicensed band. This is because the unlicensed band is a frequency band used by various wireless communication devices according to certain rules. In Table 4, when the value of the channel access priority class is p=3 or p=4, the unlicensed band is used for a long term according to the regulations, and there is no wireless communication device using other technology, the wireless communication device may be configured with Tmcot,p=10 ms. Otherwise, the wireless communication device may be configured with Tmcot,p=8 ms.

Table 5 shows values of parameters used for a channel access for each channel access priority class for uplink transmission used in the LTE LAA system.

TABLE 5

| LBT priority class | n | CWmin | CWmax | MCOT | Set of CW sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms (see note 1) or 10 ms (see note 2) | {15, 31, 63, 127, 255, 511, 1023} |
| 4 | 7 | 15 | 1023 | 6 ms (see note 1) or 10 ms (see note 2) | {15, 31, 63, 127, 255, 511, 1023} |

NOTE 1:
The MCOT of 6 ms may be increased to 8 ms by inserting one or more gaps. The minimum duration of a pause shall be 100 μs. The maximum duration (Channel Occupancy) before including any such gap shall be 6 ms. The gap duration is not included in the channel occupancy time.
NOTE 2:
If the absence of any other technology sharing the carrier can be guaranteed on a long term basis (e.g. by level of regulation), the maximum channel occupancy time (MCOT) for LBT priority classes 3 and 4 is for 10 ms, otherwise, the MCOT for LBT priority classes 3 and 4 is 6 ms as in note 1.

As described in Table 5, the MCOT value 6 ms may be increased to 8 ms when one or more gaps are included in the transmission. The gap represents the time from when the transmission is stopped in a carrier until the transmission is resumed in the carrier. In this case, the minimum value of the duration of the gap is 100 μs. Furthermore, the maximum value of the duration of transmission performed before the gap is included is 6 ms. Furthermore, the duration of the gap is not included in the channel occupancy time. When the value of the channel access priority class is 3 or 4 and it is guaranteed that no other radio access technology is used in the carrier on which the channel access is performed, the value of MCOT may be 10 ms. In this case, another wireless access technology may include Wi-Fi. Otherwise, the value of the MCOT may be determined as described in Note 1 of Table 5.

The COT represents the time the wireless communication device occupies a channel. As described above, the MCOT represents a time during which the initiating node is able to continuously occupy a channel in any one carrier of a unlicensed band to the maximum. However, as described above, the gap, which is an interval in which the transmission is not performed, may be included between a plurality of transmissions, and when the gap is included, the value of the MCOT may be applied differently.

<Sidelink (SL) Communication>

SL communication refers to a communication method that enables UEs to establish a direct link and to directly exchange voice or data without going through a base station. In SL communication, the base station of FIG. 14 may be replaced with a UE. SL communication may be interchangeable with vehicle-to-everything (V2X) communication.

Figure 16:
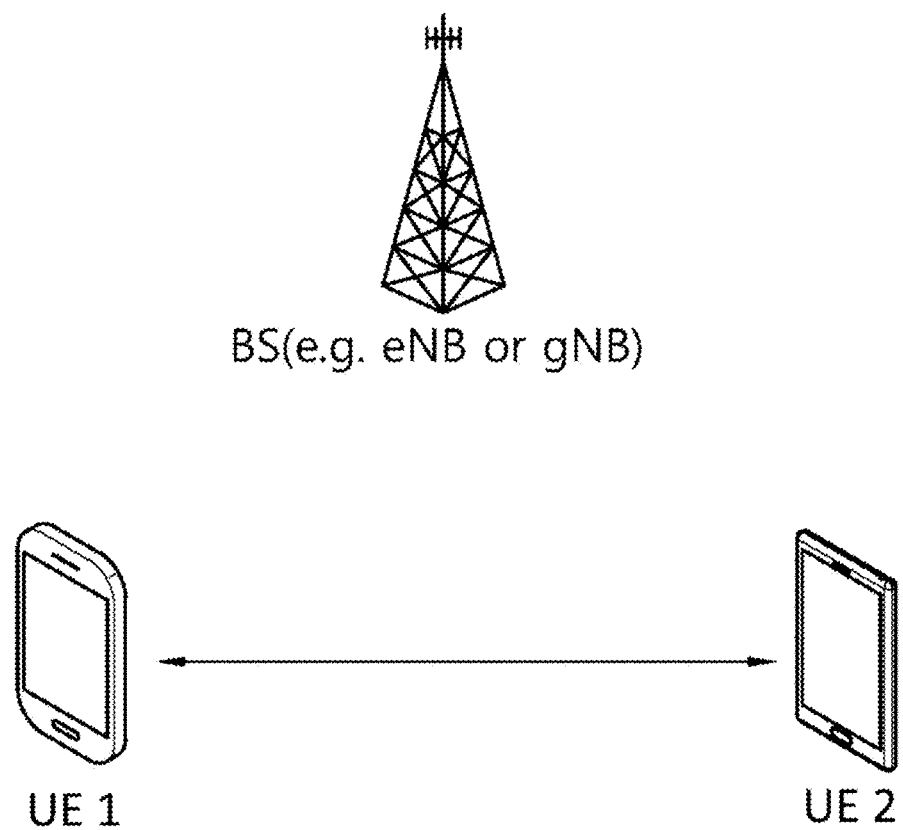
FIGS. 16 to 23 illustrate examples of a sidelink (SL) communication process.

FIG. 16 illustrates an example of a UE and a base station for performing V2X or SL communication.

Referring to FIG. 16, in V2X/SL communication, the term "UE" may mostly refer to a UE of a user. However, when a network device, such as a base station, transmits and receives a signal according to a communication method between UEs, the base station may also be considered as a type of UE.

UE 1 may select a resource unit corresponding to a specific resource from a resource pool that is a set of resources, and may operate to transmit an SL signal by using the resource unit. UE 2, which is a receiving UE, may receive the configuration of the resource pool for UE 1 to transmit a signal, and may detect a signal of UE 1 from the resource pool.

Here, when UE 1 is within the connectivity range of a base station, the base station may report the resource pool. However, when UE 1 is outside the connectivity range of the base station, another UE may report the resource pool, or the resource pool may be determined as a predetermined resource.

Figure 17:
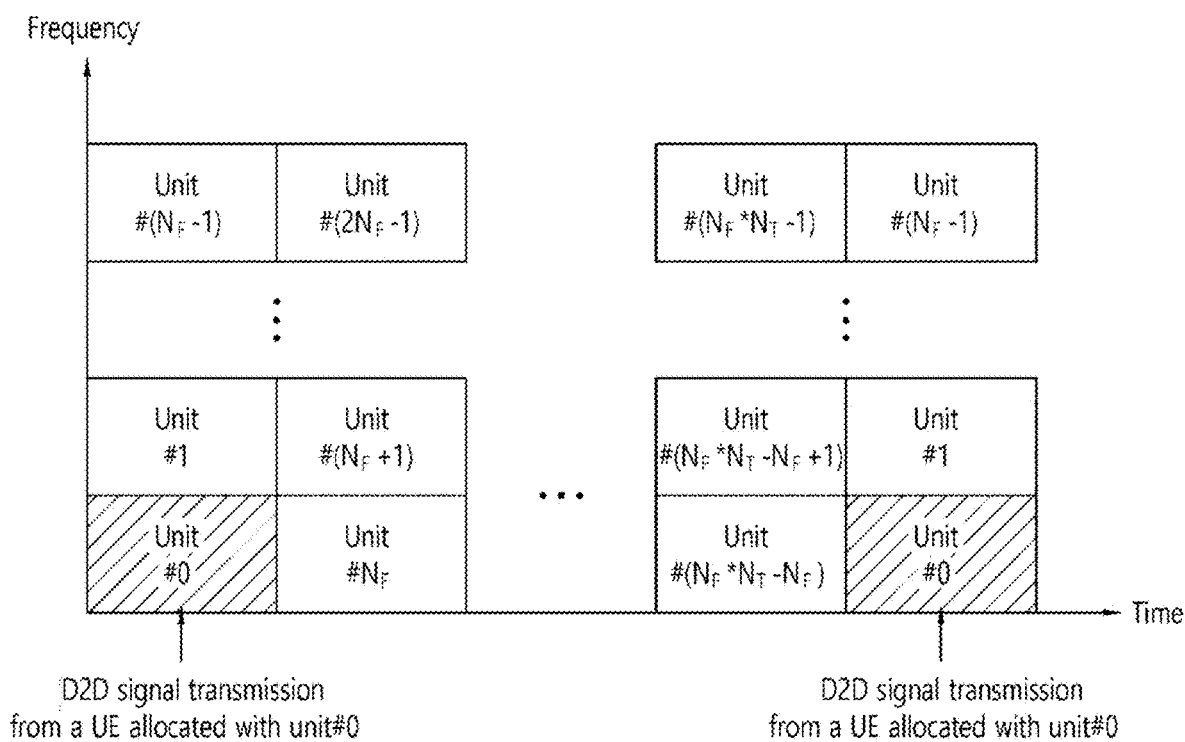

FIG. 17 illustrates an example of a resource unit for V2X or SL communication.

Referring to FIG. 17, a resource pool may include a plurality of resource units, and each UE may select and use one resource unit or a plurality of resource units to transmit an SL signal. All frequency resources of the resource pool may be divided into $N_F$ units, and all time resources of the resource pool may be divided into $N_T$ units. Therefore, a total of $N_F * N_T$ resource units may be defined in the resource pool.

As illustrated in FIG. 17, one resource unit (e.g., Unit #0) may be periodically repeated. Alternatively, to obtain a diversity effect in a time or frequency dimension, the index of a physical resource unit to which one logical resource unit is mapped may change in a predetermined pattern over time. In this structure of resource units, the resource pool may refer to a set of resource units that a UE wanting to transmit an SL signal may use for transmission.

Resource pools may be divided into a plurality of types. For example, resource pools may be classified as follows depending on the content of an SL signal transmitted in each resource pool.

(1) A scheduling assignment (SA) may be a signal including information, such as the position of a resource that a transmitting UE uses to transmit an SL data channel, a modulation and coding scheme (MCS) or a multiple-input multiple-output (MIMO) transmission method required to demodulate other data channels, and timing advance (TA). The SA may also be multiplexed and transmitted with SL data on the same resource unit, in which case an SA resource pool may refer to a resource pool in which the SA is multiplexed and transmitted with the SL data. The SA may also be referred to as an SL control channel.

(2) A SL data channel (physical sidelink shared channel: PSSCH) may be a resource pool used by a transmitting UE to transmit user data. If an SA is multiplexed and transmitted with SL data on the same resource unit, only an SL data channel excluding SA information may be transmitted in a resource pool for the SL data channel. That is, resource elements (REs) used to transmit SA information on an individual resource unit within an SA resource pool may still be used to transmit SL data in the resource pool for the SL data channel.

Hereinafter, resource allocation in an SL will be described.

Figure 18:
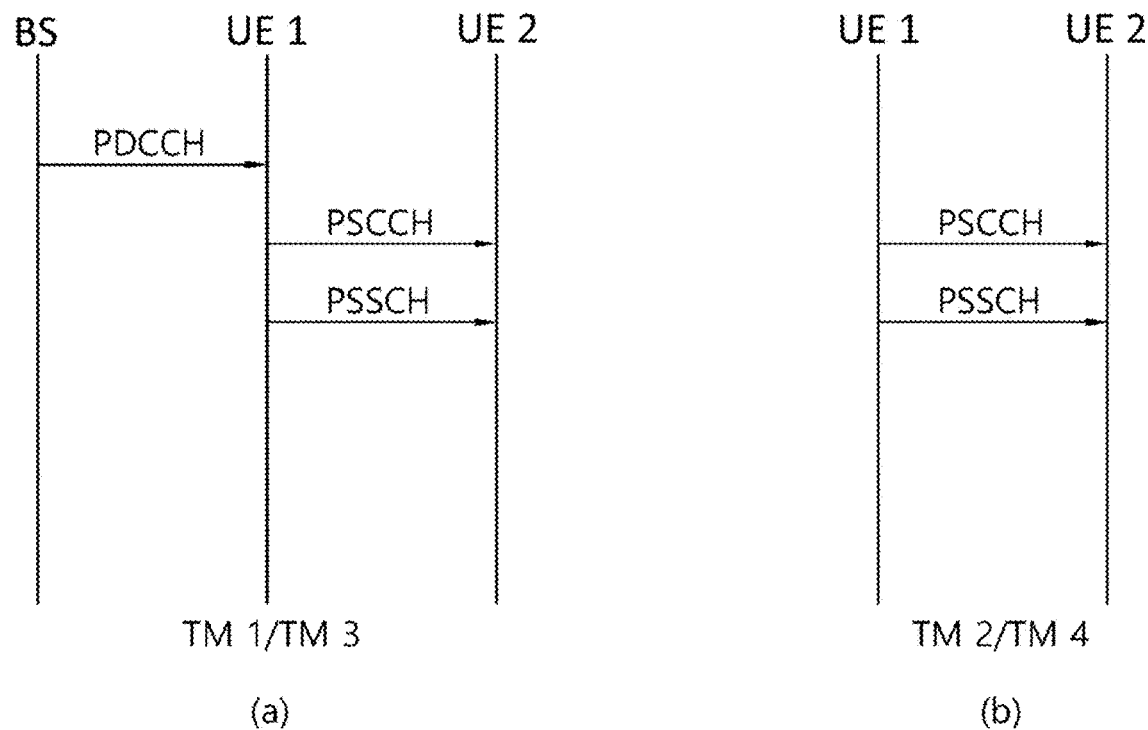

FIG. 18 illustrates an example of a procedure in which a UE performs V2X or SL communication according to a transmission mode.

Referring to FIG. 18, (a) of FIG. 18 illustrates a UE operation related to transmission mode 1 or transmission mode 3, and (b) of FIG. 18 illustrates a UE operation related to transmission mode 2 or transmission mode 4.

Referring to (a) of FIG. 18, in transmission mode 1/3, a base station performs resource scheduling for UE 1 through a PDCCH (more specifically, downlink control information (DCI)), and UE 1 performs SL/V2X communication with UE 2 according to the resource scheduling. UE 1 may transmit sidelink control information (SCI) to UE 2 through a physical sidelink control channel (PSCCH), and then transmit data based on the SCI through a physical sidelink shared channel (PSSCH). In an LTE SL, transmission mode 1 may be applied to general SL communication, and transmission mode 3 may be applied to V2X SL communication.

Referring to (b) of FIG. 18, in transmission mode 2/4, a UE may autonomously schedule a resource. More specifically, in an LTE SL, transmission mode 2 may be applied to general SL communication, in which a UE may perform an SL operation by autonomously selecting a resource from a configured resource pool. Transmission mode 4 may be applied to V2X SL communication, in which a UE may autonomously select a resource within a selection window via sensing/SA decoding processes, and then perform a V2X SL operation. UE 1 may transmit SCI to UE 2 through a PSCCH, and then transmit data based on the SCI through a PSSCH. Hereinafter, a transmission mode may be abbreviated to a mode. Procedures related to sensing and resource (re)selection may be supported in resource allocation mode 2. The sensing procedure may be defined as decoding SCI from another UE and/or SL measurement. Decoding the SCI in the sensing procedure may provide at least information about an SL resource indicated by a UE transmitting the SCI. When the SCI is decoded, the sensing procedure may use L1 SL reference signal received power (RSRP) measurement based on an SL demodulation reference signal (DMRS). The resource (re)selection procedure may use the result of the sensing procedure to determine a resource for SL transmission.

Figure 19:
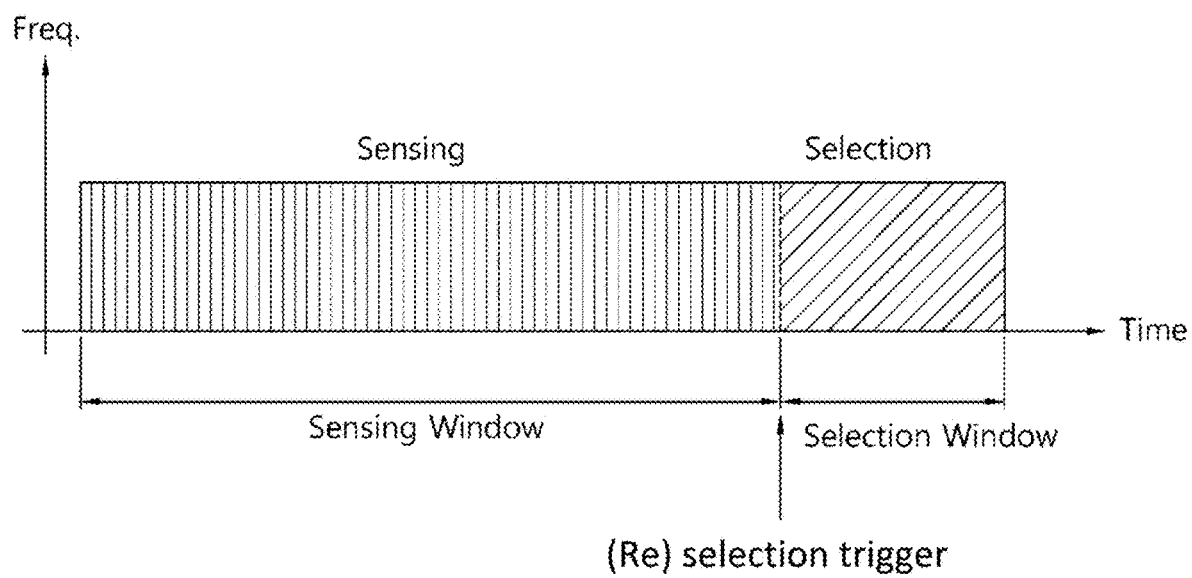

FIG. 19 illustrates an example of a method in which a UE selects a transmission resource for transmitting a signal.

Referring to FIG. 19, a UE may identify transmission resources reserved by other UEs or resources being used by other UEs through sensing within a sensing window, and may randomly select a resource with less interference among the remaining resources, excluding the reserved or used resources, within a selection window.

For example, the UE may decode a PSCCH including information about the period of the reserved resources within the sensing window, and may measure the PSSCH RSRP of resources periodically determined based on the PSCCH. The UE may exclude resources having a PSSCH RSRP value exceeding a threshold value from the selection window. Subsequently, the UE may randomly select an SL resource among the remaining resources within the selection window.

Figure 20:
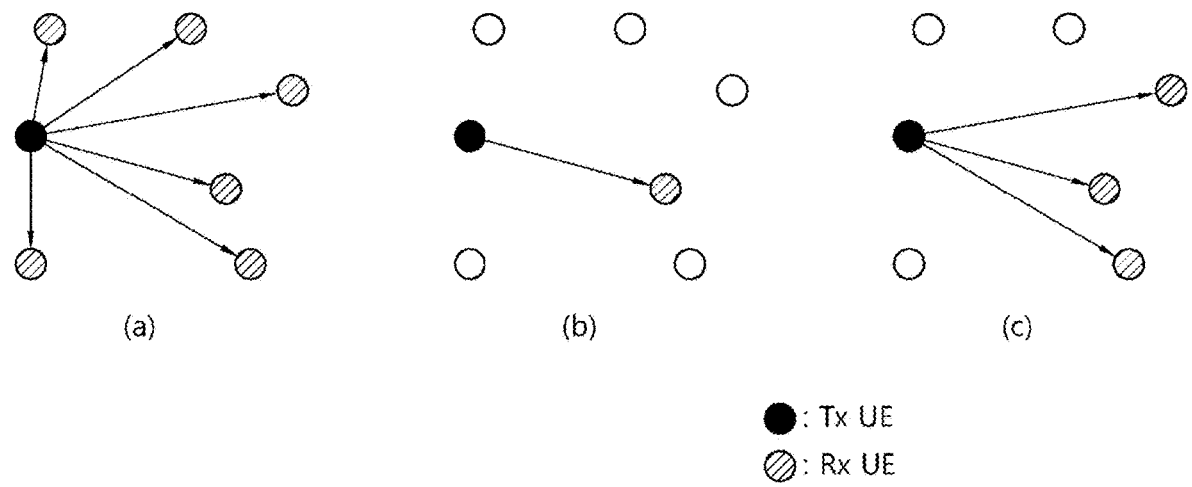

FIG. 20 illustrates an example of three cast types of NR sidelink.

Referring to FIG. 20, NR sidelink supports three types of casts: unicast, groupcast, and broadcast. In unicast SL communication, a UE may perform one-to-one communication with another UE. In groupcast SL communication, a UE may perform SL communication with one or more UEs in a group to which the UE belongs. Groupcast SL communication may be replaced with SL multicast communication, SL one-to-many communication, or the like.

Hereinafter, a hybrid automatic repeat request (HARQ) procedure in an SL is described.

In SL unicast and groupcast, HARQ feedback and HARQ combining in a physical layer may be supported. For example, when a receiving UE operates in resource allocation mode 1 or 2, the receiving UE may receive a PSSCH from a transmitting UE, and may transmit HARQ feedback on the PSSCH to the transmitting UE through a physical sidelink feedback channel (PSFCH) by using a sidelink feedback control information (SFCI) format.

For example, SL HARQ feedback may be enabled for groupcast. That is, in a non-CBG operation, two HARQ feedback options may be supported for groupcast.

(1) Groupcast option 1: After a receiving UE decodes a PSCCH targeted at the receiving UE, when the receiving UE fails to decode a transport block related to the PSCCH, the receiving UE may transmit an HARQ-NACK to a transmitting UE through a PSFCH. However, when the receiving UE decodes the PSCCH targeted at the receiving UE and successfully decodes the transport block related to the PSCCH, the receiving UE may not transmit an HARQ-ACK to the transmitting UE.

(2) Groupcast option 2: After a receiving UE decodes a PSCCH targeted at the receiving UE, when the receiving UE fails to decode a transport block related to the PSCCH, the receiving UE may transmit an HARQ-NACK to a transmitting UE via a PSFCH. When the receiving UE decodes the PSCCH targeted at the receiving UE and successfully decodes the transport block related to the PSCCH, the receiving UE may transmit an HARQ-ACK to the transmitting UE via the PSFCH.

For example, in SL communication related to a service having a requirement of high reliability or a service having a requirement of relatively high reliability, an SL HARQ feedback operation and/or mechanism of a UE may be useful. For example, in SL communication related to a service having a requirement of high reliability, an operation in which a UE receiving the service transmits SL HARQ feedback to a UE transmitting the service may be useful for satisfying the requirement of high reliability.

An HARQ feedback resource may include an HARQ feedback transmission resource and/or an HARQ feedback reception resource. For example, the HARQ feedback transmission resource may include a resource for transmitting HARQ feedback and/or a resource related to transmission of HARQ feedback. For example, the HARQ feedback reception resource may include a resource for receiving HARQ feedback and/or a resource related to reception of HARQ feedback.

A PSSCH resource may include a PSSCH transmission resource and/or a PSSCH reception resource. For example, the PSSCH transmission resource may include a resource for transmitting a PSSCH and/or a resource related to transmission of a PSSCH. For example, the PSSCH reception resource may include a resource for receiving a PSSCH and/or a resource related to reception of a PSSCH.

A PSCCH resource may include a PSCCH transmission resource and/or a PSSCH reception resource. For example, the PSCCH transmission resource may include a resource for transmitting a PSCCH and/or a resource related to transmission of a PSCCH. For example, the PSCCH reception resource may include a resource for receiving a PSCCH and/or a resource related to reception of a PSCCH.

The resources may include at least one of a time domain resource, a frequency domain resource, and/or a code domain resource.

When a resource collision occurs in at least one of PSSCH transmission, PSCCH transmission, and/or HARQ feedback transmission of a UE, an SL HARQ feedback procedure and/or operation of the UE may be difficult to operate correctly. For example, when a resource collision occurs in at least one of PSSCH transmission, PSCCH transmission, and/or HARQ feedback transmission of a UE, an overall SL HARQ feedback procedure and/or operation of the UE may be difficult to perform accurately.

When a receiving UE successfully receives a PSSCH but an error occurs in HARQ feedback (e.g., an HARQ ACK) due to a resource collision, a transmitting UE may needlessly retransmit the PSSCH to the receiving UE. For example, when the receiving UE fails to receive a PSSCH and HARQ feedback is not delivered to the transmitting UE due to a resource collision, reliability or performance related to SL communication may be reduced. For example, when the receiving UE fails to receive a PSCCH and/or a PSSCH transmitted from the transmitting UE and an HARQ NACK corresponding to the PSCCH and/or the PSSCH is not correctly delivered to the transmitting UE due to a resource collision, reliability or performance related to SL communication may be reduced. Therefore, an HARQ feedback resource needs to be determined so as to avoid or minimize a collision between a plurality of UEs.

The transmitting UE may transmit a PSCCH and/or a PSSCH to the receiving UE. For example, the transmitting UE may transmit SL information to the receiving UE by using a PSCCH resource and/or a PSSCH resource. For example, the SL information may include at least one of SL control information, SL data, an SL packet, a SL transport block (TB), an SL message, and/or an SL service.

The receiving UE may determine the HARQ feedback resource. Additionally, for example, the transmitting UE may determine the HARQ feedback resource.

The HARQ feedback resource may be configured to have an association or linkage with the PSSCH. For example, the HARQ feedback resource may include at least one of a time domain resource, a frequency domain resource, and/or a code domain resource. For example, the position of the HARQ feedback resource may be configured to have an association or linkage with an associated PSSCH resource. For example, the position of the HARQ feedback resource may be configured to have an association or linkage with the position of the associated PSSCH resource, based on a predefined function. For example, the HARQ feedback resource may be determined based on at least one of information about a time domain related to the PSSCH, information about a frequency domain related to the PSSCH, and/or information about a code domain related to the PSSCH.

In addition/alternatively, for example, the HARQ feedback resource may be configured to have an association or linkage with the PSCCH. For example, the position of the HARQ feedback resource may be configured to have an association or linkage with an associated PSCCH resource. For example, the position of the HARQ feedback resource may be configured to have an association or linkage with the position of the associated PSCCH resource, based on a predefined function. For example, the HARQ feedback resource may be determined based on at least one of information about a time domain related to the PSCCH, information about a frequency domain related to the PSCCH, and/or information about a code domain related to the PSCCH.

The HARQ feedback resource may be configured in the form of a subset of frequency resources used for PSSCH transmission and/or PSCCH transmission. For example, the frequency domain of the HARQ feedback resource may be configured in the form of a subset of the frequency domain of the associated PSSCH resource and/or PSCCH resource. For example, the frequency domain of the HARQ feedback resource may be included in the frequency domain of the PSSCH resource and/or the PSCCH resource.

Figure 21:
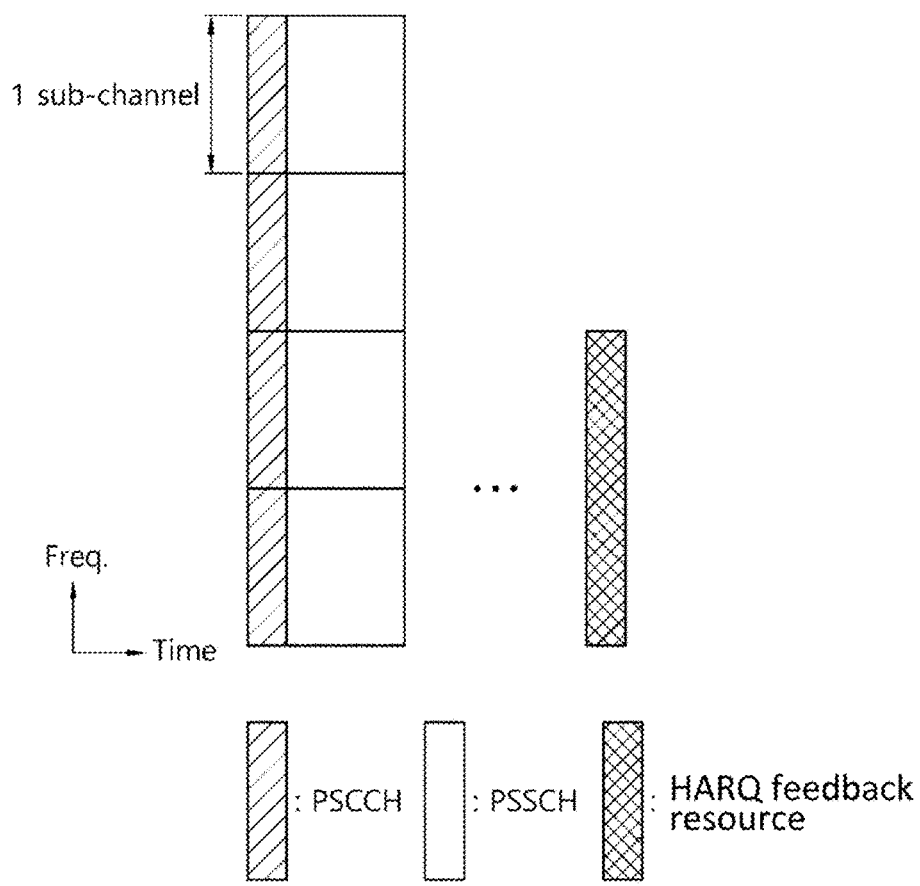

FIG. 21 illustrates an example of a resource for transmitting HARQ feedback in NR sidelink.

Referring to FIG. 21, a transmitting UE may transmit a PSCCH and/or a PSSCH to a receiving UE through four subchannels. In this case, the frequency domain of an HARQ feedback resource related to the PSCCH and/or the PSSCH may be a subset of frequency resources used by the transmitting UE to transmit the PSCCH and/or the PSSCH.

A time gap may be configured between the HARQ feedback resource and a PSSCH resource. In addition/alternatively, for example, a time gap may be configured between the HARQ feedback resource and a PSCCH resource. For example, the time gaps may be configured between time when the receiving UE receives the PSSCH and/or the PSCCH and time when the receiving UE transmits HARQ feedback considering the decoding capability of the UE and/or a delay requirement (e.g., a V2X message and/or a service-related delay requirement). For example, the time gaps may be configured between time when the transmitting UE receives the HARQ feedback and time when the transmitting UE (re)transmits the PSSCH and/or PSCCH considering the decoding capability of the UE and/or the delay requirement.

The time gap may be configured commonly within a resource pool. For example, the time gap may be configured commonly between different UEs within the resource pool. For example, the time gap may be configured commonly for the transmitting UE and the receiving UE. Therefore, the UE may simply determine the HARQ feedback resource. For example, the time gap maybe configured to be specific to the resource pool.

The time gap may be configured or designated to be less than and/or equal to the smallest value among the latency budgets of coexisting services on the resource pool. For example, when service A and service B coexist on the resource pool and the latency budget of service A is less than the latency budget of service B, the time gap may be configured or designated to be less than or equal to the latency budget of service A.

The time gap may be designated such that the maximum number of retransmissions related to a transport block (TB) configured specifically to the resource pool, the type of a service, the priority of a service, the type of cast, and/or a QoS requirement of a service may be (entirely) supported/performed within a latency budget for a (related) service on the resource pool. For example, the maximum number of retransmissions may be the maximum number of allowable retransmissions including initial transmission.

The time gap may be configured or designated to be greater than and/or equal to the greatest value among the decoding capabilities of UEs. For example, the decoding capability may be the processing time of the UE needed from time when the UE terminates/ends reception of the PSSCH to time when the UE starts to transmit a PSFCH. In addition/alternatively, for example, the decoding capability may be the processing time of the UE needed from time when the UE terminates/ends reception of the PSCCH to time when the UE starts to transmit a PSFCH. For example, the time gap may be configured or designated to be greater than and/or equal to the greatest value among the decoding capabilities of the UEs in the resource pool. For example, when UE A, UE B, and UE C perform SL communication in the resource pool and the decoding capability of UE A is the lowest, the time gap may be configured or designated to be a value greater than or equal to processing time required from time when UE terminates/ends reception of a PSSCH and/or a PSCCH reception of UE A to time when UE A starts to transmit a PSFCH.

The time gap may be configured differently or independently according to the type of a service, the priority of a service, the type of SL communication, a session related to a service, a PPPP related to a service, a PPPR related to a service, a target block error rate (BLER) related to a service, a target signal-to-interference plus noise ratio (SINR) related to a service, a delay budget related to a service, and/or a UE capability. For example, the time gap may be configured differently or independently according to the type of a service, the priority of a service, the type of SL communication, a session related to a service, a PPPP related to a service, a PPPR related to a service, a target block error rate (BLER) related to a service, a target signal-to-interference plus noise ratio (SINR) related to a service, a delay budget related to a service, and/or a UE capability within the resource pool. For example, the type of SL communication may include at least one of unicast, groupcast, and/or broadcast.

The receiving UE may transmit HARQ feedback to the transmitting UE. For example, the receiving UE may transmit HARQ feedback corresponding to the PSCCH and/or the PSSCH to the transmitting UE. For example, the receiving UE may transmit the HARQ feedback to the transmitting UE by using the HARQ feedback resource determined based on the PSCCH resource and/or the PSSCH resource. For example, the transmitting UE may receive the HARQ feedback from the receiving UE on the HARQ feedback resource determined based on the PSCCH resource and/or the PSSCH resource.

When the receiving UE successfully receives the PSCCH and/or the PSSCH, the HARQ feedback may be an HARQ ACK. For example, when the receiving UE fails to receive the PSCCH and/or the PSSCH, the HARQ feedback may be at least one of an HARQ NACK and/or discontinuous detection (DTX).

In groupcast in which a plurality of UEs in a group performs SL communication with each other, an HARQ feedback resource may be configured in two forms.

(1) Option A: A common HARQ feedback resource may be configured for receiving UEs. For example, when a transmitting UE transmits a PSSCH and/or a PSCCH to a plurality of receiving UEs, an HARQ feedback resource may be configured commonly for the plurality of receiving UEs having received the PSSCH and/or the PSCCH.

(2) Option B: Different or independent HARQ feedback resources may be configured for receiving UEs. For example, different or independent HARQ feedback resources may be configured for respective receiving UE or for respective subgroups including one or more receiving UEs. For example, when a transmitting UE transmits a PSSCH and/or a PSCCH to a plurality of receiving UEs, different or independent HARQ feedback resources may be configured respectively for the plurality of receiving UEs or a plurality of subgroups having received the PSSCH and/or the PSCCH.

Option A may be applied only to groupcast option 1. For example, in groupcast option 1, a plurality of receiving UEs may transmit an HARQ NACK to a transmitting UE by using an HARQ feedback resource configured commonly for the plurality of receiving UEs only when failing to receive a PSCCH and/or PSSCH. For example, the HARQ NACK may be configured in the form of a single-frequency network (SFN). In this case, the transmitting UE may not separately receive HARQ NACKs transmitted by the plurality of receiving UEs. Therefore, the transmitting UE may not know which receiving UE has transmitted an HARQ NACK. However, the transmitting UE may know that at least one of the plurality of receiving UEs has transmitted an HARQ NACK, and may retransmit the PSCCH and/or PSSCH to the plurality of receiving UEs.

In option A, a unicast-related HARQ feedback resource structure may be reused. In addition/alternatively, for example, in option A, overhead related with an HARQ feedback resource may be reduced. However, in option A, there may be a limitation that the transmitting UE is unable to determine/recognize a DTX. For example, when a transmitting UE transmits a PSSCH and/or PSCCH to a receiving UE, the receiving UE may fail to receive the PSCCH that schedules the PSSCH. In this case, according to option A, the receiving UE may not transmit an HARQ NACK to the transmitting UE. Therefore, the transmitting UE may misunderstand that the receiving UE has successfully received the PSSCH.

In option B, in a group including a plurality of receiving UEs, different or independent HARQ feedback resources may be allocated to the respective receiving UE or respective subgroups. Here, for example, according to option B, as the number of receiving UEs or subgroups included in the group increases, a larger number of HARQ feedback resources may be required. For example, for a group including N receiving UEs, N−1 HARQ feedback resources may be required. For example, option B may be restrictively applied only to groupcast option 2.

Figure 22:
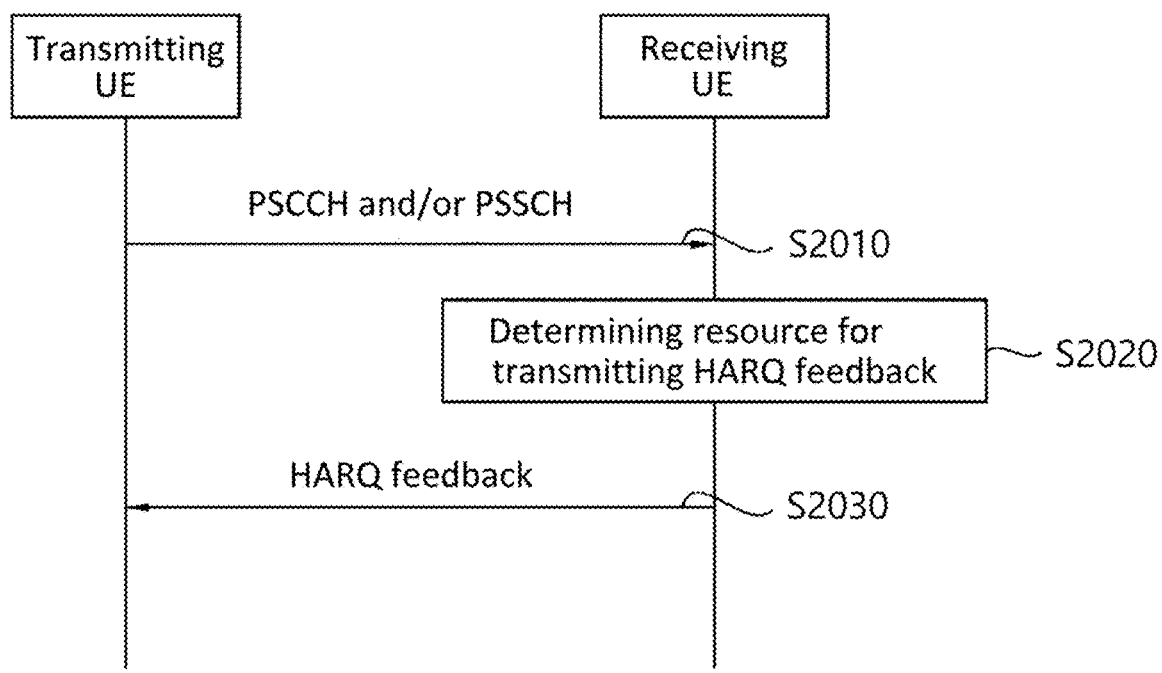

FIG. 22 illustrates an example of a procedure for transmitting and receiving HARQ feedback on a PSCCH and/or a PSSCH.

Referring to FIG. 22, a plurality of receiving UEs may each transmit HARQ feedback to a transmitting UE. For example, the plurality of receiving UEs may each transmit HARQ feedback corresponding to a PSCCH and/or PSSCH to the transmitting UE. The plurality of receiving UEs may each transmit the HARQ feedback to transmitting UE by using an HARQ feedback resource determined based on a PSCCH resource and/or a PSSCH resource.

When the receiving UEs successfully receive the PSCCH and/or the PSSCH, the HARQ feedback may be an HARQ ACK. For example, when the receiving UEs fail to receive the PSCCH and/or the PSSCH, the HARQ feedback may be at least one of an HARQ NACK and/or discontinuous detection (DTX).

A UE may determine HARQ feedback transmission power, based on at least one of an SL path loss value derived/obtained based on a reference signal on an SL channel, an SL RSRP value derived/obtained based on the reference signal on the SL channel, an SL RSRQ value derived/obtained based on the reference signal on the SL channel, an open-loop power control parameter, and/or a closed-loop power control parameter. For example, when a transmitting UE transmits a reference signal to a receiving UE through an SL channel, the receiving UE may determine HARQ feedback transmission power, based on at least one of an SL path loss value derived/obtained based on the reference signal on the SL channel, an SL RSRP value derived/obtained based on the reference signal on the SL channel, an SL RSRQ value derived/obtained based on the reference signal on the SL channel, an open-loop power control parameter, and/or a closed-loop power control parameter.

The reference signal on the SL channel may be defined in advance. The reference signal on the SL channel may be a DMRS transmitted on a PSSCH (i.e., a PSSCH DMRS) or a DMRS transmitted on a PSCCH (i.e., a PSCCH DMRS). The reference signal on the SL channel may be a CSI-RS transmitted on a PSSCH. The reference signal on the SL channel may be a reference signal used for estimating the quality (e.g., a CQI, a PMI, or an RI) of the SL channel. For example, the reference signal on the SL channel may be a reference signal used for measuring at least one of an SL path loss value, an SL RSRP value, and/or an SL RSRQ value.

The SL path loss may be path loss in a link between the transmitting UE and the receiving UE. For example, the open-loop power control parameter and/or the closed-loop power control parameter may be configured in advance. For example, the open-loop power control parameter may include Po and/or an alpha value.

Po may be a power control parameter for satisfying a target error rate (e.g., a block error rate (BLER) or a frame error rate (FER)) related to packet/message transmission on average. In addition/alternatively, for example, Po may be a power control parameter related to an average received SINR between the transmitting UE and the receiving UE. For example, Po may be a power control parameter specific to a UE, a resource pool, the type of a service, the priority of a service, a QoS requirement related to a service, the size of a (frequency) resource used for SL transmission, an MCS value used for SL transmission, a congestion level (e.g., a CBR) related to a resource pool, and/or the type of cast. For example, when the HARQ feedback transmission power is calculated/derived based on the SL RSRP and/or SL RSRQ value/range, a different Po value/range may be mapped/configured for each (preconfigured) SL RSRP and/or SL RSRQ values/ranges.

When the HARQ feedback transmission power is derived/calculated based on the SL path loss, an alpha value may be a weight applied to (measured) path loss compensation. In addition/alternatively, when the HARQ feedback transmission power is calculated/derived based on the SL RSRP and/or SL RSRQ value/range, an alpha value may be a weight applied to the (measured) SL RSRP and/or SL RSRQ value/range. In addition/alternatively, when the HARQ feedback transmission power is calculated/derived based on the SL RSRP and/or SL RSRQ value/range, an alpha value may be a weight applied to HARQ feedback transmission power mapped/configured for each (measured) SL RSRP and/or SL RSRQ value/range. Here, an alpha value/range may be configured to be specific to a UE, a resource pool, the type of a service, the priority of a service, a QoS requirement related to a service, the size of a (frequency) resource used for SL transmission, an MCS value used for SL transmission, a congestion level (e.g., a CBR) related to a resource pool, and/or the type of cast. When the HARQ feedback transmission power is calculated/derived based on the SL RSRP and/or SL RSRQ value/range, a different alpha value/range may be mapped/configured for each (preconfigured) SL RSRP and/or SL RSRQ value/range.

When the HARQ feedback transmission power is calculated/derived based on the SL RSRP and/or SL RSRQ value/range, a different offset value/range may be mapped/configured for each (preconfigured) SL RSRP and/or SL RSRQ value/range. The UE that measures the SL RSRP and/or SL RSRQ may apply an offset related to the SL RSRP value and/or the SL RSRQ value to (preconfigured normalized or nominal) SL (HARQ feedback) (maximum) transmission power, thereby determining final HARQ feedback transmission power. Here, for example, the offset value/range may be configured to be specific to a UE, a resource pool, the type of a service, the priority of a service, a QoS requirement related to a service, the size of a (frequency) resource used for SL transmission, an MCS value used for SL transmission, a congestion level (e.g., a CBR) related to a resource pool, and/or the type of cast.

A different (normalized or nominal) (maximum) HARQ feedback transmission power value/range may be mapped/configured for each SL RSRP and/or SL RSRQ value/range. For example, the (normalized or nominal)(maximum) HARQ feedback transmission power value/range may be configured to be specific to a UE, a resource pool, the type of a service, the priority of a service, a QoS requirement related to a service, the size of a (frequency) resource used for SL transmission, an MCS value used for SL transmission, a congestion level (e.g., a CBR) related to a resource pool, and/or the type of cast.

A transmission power value related to the reference signal and/or the SL channel including the reference signal may be signaled to the UE via a predefined channel. The transmitting UE may transmit the transmission power value related to the reference signal and/or the SL channel including the reference signal to the receiving UE via the predefined channel. The predefined channel may be a PSCCH. The receiving UE may be a terminal measuring at least one of SL path loss, SL RSRP, and/or SL RSRQ, based on the reference signal.

The open-loop power control parameter (and/or (maximum or minimum) HARQ feedback transmission power value mapped/configured for each SL RSRP (and/or SL RSRQ) value/range) may be configured differently or independently according to the type of a service, the priority of a service, the type of SL communication (e.g., unicast, groupcast, or broadcast), a congestion level (e.g., a channel busy ration (CBR)) (related to a resource pool), a session related to a service, a PPPP related to a service, a PPPR related to a service, a target block error rate (BLER) related to a service, a target signal-to-interference plus noise ratio (SINR) related to a service, a (minimum or maximum) target communication distance related to a service, and/or a delay budget related to a service. In addition/alternatively, for example, the closed-loop power control operation/parameter may be managed/configured differently or independently according to the type of a service, the priority of a service, the type of SL communication (e.g., unicast, groupcast, or broadcast), a congestion level(e.g., CBR)(related to a resource pool), a session related to a service, a PPPP related to a service, a PPPR related to a service, a target block error rate (BLER) related to a service, a target signal-to-interference plus noise ratio (SINR) related to a service, a (minimum or maximum) target communication distance related to a service, and/or a delay budget related to a service.

The open-loop power control parameter related to the HARQ feedback may be configured differently or independently from an open-loop power control parameter related to the PSSCH and/or PSCCH. In addition/alternatively, the closed-loop power control operation/parameter related to the HARQ feedback may be managed/configured differently or independently from a closed-loop power control operation/parameter related to the PSSCH and/or PSCCH.

FDM of the HARQ feedback resource may be allowed or configured only for receiving UEs of which the distance from the transmitting UE receiving the HARQ feedback is within a preset threshold value. In addition/alternatively, FDM of the HARQ feedback resource may be allowed or configured only for receiving UEs of which the SL path loss difference in a link between the transmitting UE and the receiving UEs is within a preset threshold value. In addition/alternatively, FDM of the HARQ feedback resource may be allowed or configured only for receiving UEs of which the SL RSRP difference in the link between the transmitting UE and the receiving UEs is within a preset threshold value. In addition/alternatively, FDM of the HARQ feedback resource may be allowed or configured only for receiving UEs of which the SL RSRQ difference in the link between the transmitting UE and the receiving UEs is within a preset threshold value.

When the distance difference between the plurality of receiving UEs and the transmitting UE is within the preset threshold value, the plurality of receiving UEs may transmit the HARQ feedback through a frequency-division-multiplexed resource on the frequency axis. In addition/alternatively, when the path loss difference between the plurality of receiving UEs and the transmitting UE is within the preset threshold, the plurality of receiving UEs may transmit the HARQ feedback through a frequency-division-multiplexed resource on the frequency axis. In addition/alternatively, when the (measured) RSRP value difference between the plurality of receiving UEs and the transmitting UE is within the preset threshold value, the plurality of receiving UEs may transmit a HARQ feedback through the frequency-division-multiplexed resource on the frequency axis. In addition/alternatively, when the (measured) RSRQ value difference between the plurality of receiving UEs and the transmitting UE is within the preset threshold value, the plurality of receiving UEs may transmit the HARQ feedback through a frequency-division-multiplexed resource on the frequency axis.

It may not be desirable that the HARQ feedback resource is frequency-division-multiplexed between UEs or subgroups within a group. When power control related to HARQ feedback transmission is not applied, it may not be desirable that the HARQ feedback resource is frequency-division-multiplexed between different UEs or different subgroups within a group. When the difference in HARQ feedback reception power between different UE or different subgroups within a group is greater than a preset threshold value, it may not be desirable that the HARQ feedback resource is frequency-division-multiplexed between the different UEs or different subgroups within the group. When the difference in SL path loss between different UEs or different subgroups within a group is greater than a preset threshold value, it may not be desirable that the HARQ feedback resource is frequency-division-multiplexed between the different UEs or different subgroups within the group. When the difference in SL RSRP between different UEs or different subgroups within a group is greater than a preset threshold value, it may not be desirable that the HARQ feedback resource is frequency-division-multiplexed between the different UEs or different subgroups within the group. When the difference in SL RSRQ between different UEs or different subgroups within a group is greater than a preset threshold value, it may not be desirable that the HARQ feedback resource is frequency-division-multiplexed between the different UEs or different subgroups within the group.

As in the above examples, when it is not desirable that the HARQ feedback resource to be frequency-division-multiplexed, the HARQ feedback resource may be frequency-division-multiplexed pseudo-randomly based on at least one of a GUE_ID, a receiving UE-related identifier, an SL HARQ process ID, and/or a transmitting UE-related. The HARQ feedback resource may be determined pseudo-randomly based on at least one of the GUE_ID, the receiving UE-related identifier, the SL HARQ process ID, and/or the transmitting UE-related identifier. For example, the HARQ feedback resource may be frequency-division-multiplexed or determined by a function having at least one of the GUE_ID, the receiving UE-related identifier, the SL HARQ process ID, and/or the transmitting UE-related identifier as an input parameter. The HARQ feedback resource may be an HARQ feedback resource for each of a plurality of UEs in a group. The HARQ feedback resource may be an HARQ feedback resource for each of subgroups in a group. For example, the receiving UE-related identifier may be a destination ID. The transmitting UE-related identifier may be a source ID. The function may be defined in advance.

A transmitting UE may transmit a PSCCH and/or a PSSCH to a receiving UE. The transmitting UE may transmit SL information to the receiving UE by using a PSCCH resource and/or a PSSCH resource. The SL information may include at least one of SL control information, SL data, an SL packet, an SL transport block (TB), an SL message, and/or an SL service.

The receiving UE may determine an HARQ feedback resource. In addition, the transmitting UE may determine an HARQ feedback resource. For example, the receiving UE may be one of a plurality of UEs performing groupcast communication within a group.

The HARQ feedback resource may be determined based on at least one of the PSCCH resource, the PSSCH resource, and/or a GUE_ID. When a plurality of receiving UEs in a group feeds an HARQ ACK or an HARQ NACK back to the transmitting UE by using different PSFCH resources, the plurality of receiving UEs in the group may determine the HARQ feedback resource by using the GUE_ID. The resource may include at least one of a time domain resource, a frequency domain resource, and/or a code domain resource. The GUE_ID may be information for identifying a UE in the group.

The receiving UE may transmit HARQ feedback to the transmitting UE. The receiving UE may transmit HARQ feedback corresponding to the PSCCH and/or PSSCH to the transmitting UE. For example, the receiving UE may transmit the HARQ feedback to the transmitting UE by using the HARQ feedback resource determined based on at least one of the PSCCH resource, the PSSCH resource, and/or the GUE_ID.

When the receiving UE successfully receives the PSCCH and/or the PSSCH, the HARQ feedback may be an HARQ ACK. When the receiving UE fails to receive the PSCCH and/or the PSSCH, the HARQ feedback may be at least one of an HARQ NACK and/or discontinuous detection (DTX).

When the transmitting UE selects PSSCH and/or PSCCH transmission resources through a sensing operation, a collision between HARQ feedback transmission-related resources may not occur. When a plurality of transmitting UEs selects different PSSCH and/or PSCCH transmission resources through a sensing operation, HARQ feedback resources may be determined based on the PSSCH resources and/or the PSCCH resources. Therefore, a collision between the HARQ feedback resources may be automatically avoided between UEs selecting the different PSSCH and/or PSCCH transmission resources based on the sensing operation.

When the transmitting UE transmits the same PSSCH and/or PSCCH to a plurality of receiving UEs in a group, the plurality of receiving UEs may determine HARQ feedback resources by using different GUE_IDs. Therefore, even though the plurality of receiving UEs in a group receives the same PSSCH and/or PSCCH, a collision between HARQ feedback resources may be prevented.

Figure 23:
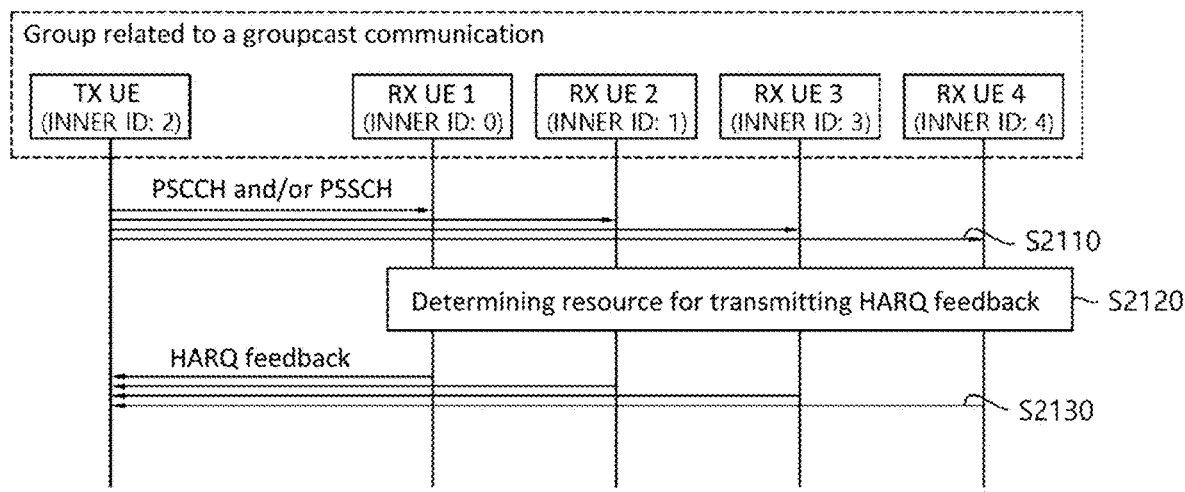

FIG. 23 illustrates an example of a procedure for transmitting and receiving HARQ feedback on a PSCCH and/or a PSSCH in groupcast SL communication.

Referring to FIG. 23, an ID for identifying a UE within a group may be allocated/designated to a plurality of UEs in the group. The ID may be referred to as an inner ID. The inner ID may be a purpose or a parameter, such as a GUE_ID. For example, regarding specific groupcast traffic, an application layer may transmit information about the inner ID of a UE and information about the number of UEs in a group to a V2X layer. The UE may be a UE transmitting the specific groupcast traffic. Regarding the specific groupcast traffic, the application layer may not transmit information about the inner ID of another UE in the group to the V2X layer. The groupcast traffic may include at least one of a groupcast service, groupcast data, a groupcast packet, and/or a groupcast message.

When a transmitting UE wants to transmit first traffic related to groupcast to a plurality of receiving UEs in a group, an application layer of the transmitting UE may transmit information about the inner ID of the transmitting UE and information about the number of UEs in the group to a V2X layer of the transmitting UE. An application layer of receiving UE 1 may transmit information about the inner ID of receiving UE 1 and information about the number of UEs in the group to a V2X layer of receiving UE 1. An application layer of receiving UE 2 may transmit information about the inner ID of receiving UE 2 and information about the number of UEs in the group to a V2X layer of receiving UE 2. An application layer of receiving UE 3 may transmit information about the inner ID of receiving UE 3 and information about the number of UEs in the group to a V2X layer of the receiving UE 3. An application layer of receiving UE 4 may transmit information about the inner ID of receiving UE 4 and information about the number of UEs in the group to a V2X layer of receiving UE 4.

The V2X layer of the UE may transmit the information about the inner ID of the UE and the information about the number of UEs in the group to an AS layer of the UE. In addition, for example, the V2X layer of the UE may also transmit an L2 ID (e.g., a source L2 ID or a destination L2 ID) and/or QoS information to the AS layer of the UE.

The transmitting UE may transmit specific groupcast traffic to the plurality of receiving UEs (S2110). The specific groupcast traffic may be transmitted through a PSSCH and/or a PSCCH.

The plurality of receiving UEs may determine an HARQ feedback resource (S2120). The plurality of receiving UEs (e.g., AS layers of the plurality of receiving UEs) may determine a resource for HARQ feedback on the specific groupcast traffic, based on the information about the inner IDs thereof and the information about the number of UEs in the group according to a predefined rule.

The transmitting UE may determine a resource for the HARQ feedback (that the transmitting UE receives). The transmitting UE may derive or determine a resource for HARQ feedback from the plurality of receiving UEs related to the specific groupcast traffic, based on the information about the inner ID thereof and the information about the number of UEs in the group.

When the application layer provides the information about the inner ID of the UE and the information about the number of UEs in the group to the V2X layer of the UE, the UE may determine or consider either groupcast option 1 or the groupcast option 2 as a (selectable) HARQ feedback option for the specific groupcast traffic. The V2X layer of the UE may determine or consider either groupcast option 1 or the groupcast option 2 as (the selectable) HARQ feedback option for the specific groupcast traffic. Additionally, the UE may finally determine or consider either groupcast option 1 or the groupcast option 2 as the HARQ feedback option for the specific groupcast traffic depending on whether a predefined condition is satisfied. When all HARQ feedback resources respective for the plurality of UEs participating in groupcast are supported in a resource pool, the UE may finally determine or consider groupcast option 2 as the HARQ feedback option for the specific groupcast traffic. When all the HARQ feedback resources respectively for the plurality of UEs participating in the groupcast are not supported in the resource pool, the UE may finally determine or consider groupcast option 1 as the HARQ feedback option for the specific groupcast traffic. Such determination may be performed in the AS layer of the UE.

When the application layer does not provide the information about the number of UEs in the group to the V2X layer of the UE, the UE may determine or consider groupcast option 1 as the HARQ feedback option for the specific groupcast traffic. When the application layer does not provide the information about the inner ID of the UE and/or the information about the number of UEs in the group to the V2X layer of the UE, the UE may determine or consider groupcast option 1 as the HARQ feedback option for the specific groupcast traffic. For example, the V2X layer of the UE may determine or consider groupcast option 1 as the HARQ feedback option for the specific groupcast traffic.

When the application layer and/or the V2X layer provide the information about the inner ID of the UE and the information about the number of UEs in the group to the AS layer of the UE, the UE may determine or consider either groupcast option 1 or groupcast option 2 as the (selectable) HARQ feedback option for the specific groupcast traffic. The AS layer of the UE may determine or consider either groupcast option 1 or groupcast option 2 as the (selectable) HARQ feedback option for the specific groupcast traffic. Additionally, the UE may finally determine or consider either groupcast option 1 or the groupcast option 2 as the HARQ feedback option for the specific groupcast traffic depending on whether the predefined condition is satisfied. When all the HARQ feedback resources respective for the plurality of UEs participating in the groupcast are supported in the resource pool, the UE may finally determine or consider groupcast option 2 as the HARQ feedback option for the specific groupcast traffic. When all the HARQ feedback resources respectively for the plurality of UEs participating in the groupcast are not supported in the resource pool, the UE may finally determine or consider groupcast option 1 as the HARQ feedback option for the specific groupcast traffic. Such determination may be performed in the AS layer of the UE.

When the application layer and/or the V2X layer does not provide the information about the number of UEs in the group to the AS layer of the UE, the UE may determine or consider groupcast option 1 as the HARQ feedback option for the specific groupcast traffic. When the application layer and/or the V2X layer does not provide the information about the inner ID of the UE and/or the information about the number of UEs in the group to the AS layer of the UE, the UE may determine or consider groupcast option 1 as the HARQ feedback option for the specific groupcast traffic. For example, the AS layer of the UE may determine or consider groupcast option 1 as the HARQ feedback option for the specific groupcast traffic.

In a resource pool-specific manner, whether at least one of groupcast option 1 and/or groupcast option 2 is supported may be signaled to the UE. In a resource pool-specific manner, whether at least one of groupcast option 1 and/or groupcast option 2 is supported may be signaled to the UE according to the type of a service, the type of cast, or a QoS requirement. In a resource pool-specific manner, whether a PSFCH resource related to groupcast option 1 is configured may be signaled to the UE according to the type of service, the type of cast, or a QoS requirement. In a resource pool-specific manner, whether a PSFCH resource related to groupcast option 2 is configured may be signaled to the UE according to the type of a service, the type of cast, or a QoS requirement.

The transmitting UE may receive HARQ feedback from the plurality of receiving UEs. The transmitting UE may receive HARQ feedback based on groupcast option 1 from the plurality of receiving UEs. For example, the transmitting UE may receive HARQ feedback based on groupcast option 2 from the plurality of receiving UEs.

An HARQ feedback operation based on a specific groupcast option may be required for specific groupcast traffic. In a case of a high reliability requirement related to a service, when the transmitting UE transmits the service to a receiving UE, the receiving UE needs to perform an HARQ feedback operation based on groupcast option 2. If the receiving UE performs an HARQ feedback operation based on groupcast option 1 for the service, DTX may occur, and thus the receiving UE needs to perform the HARQ feedback operation based on groupcast option 2 for the service with the high reliability requirement. The DTX may be a problem that the transmitting UE misunderstands that the receiving UE has successfully received a PSCCH and a PSSCH when the receiving UE fails to receive the PSCCH and does not transmit an NACK to the transmitting UE. Due to the DTX, it may be difficult to satisfy the reliability requirement of the service. Therefore, if the specific groupcast option is not supported on the resource pool or if the specific groupcast option is not supported for the traffic and/or service, the transmitting UE may perform a blind retransmission operation. If a PSFCH resource related to the specific groupcast option is not configured, the transmitting UE may perform a blind retransmission operation. The transmitting UE may perform retransmission without receiving HARQ feedback from the receiving UE.

Embodiments: Channel Access for Sidelink (SL) Transmission

First, terms used herein will be explained.

Type 1 channel access procedure (CAP): Channel access procedure including random backoff (see FIG. 13). Channel sensing may be performed based on a random value selected within a CW. When a channel is determined as being idle as a result of performing channel access, SL transmission may be performed.

Type 2 CAP: Channel access procedure not including random backoff. Channel sensing may be performed during a fixed-length sensing period for channel transmission. The type 2 CAP may be classified into type 2A/2B/2C according to the fixed-length sensing period.

Type 2A CAP: SL transmission may be performed immediately after sensing whether a channel is idle for at least a sensing period of 25 μs before the SL transmission for the transmission. 25 μs includes a 16-μs period ($T_f$) and one immediately following sensing slot (9 μs), and the 16-μs ($T_f$) period includes one sensing slot (9 μs) from the beginning. When all sensing slots of 25 μs are sensed as idle, the channel is determined as available for the 25-μs period.

Type 2B CAP: SL transmission may be performed immediately after sensing whether a channel is idle within a period of 16 μs ($T_f$) before the SL transmission for the transmission. 16 μs ($T_f$) includes one sensing slot within the last 9 μs of 16 μs. When the channel is sensed as idle for a total period of at least 5 μs including at least 4 μs for which sensing occurs in the sensing slot, the channel is determined as idle.

Type 2C CAP: Refers to SL transmission being performed without performing channel sensing before the SL transmission for the transmission (i.e., No LBT). The maximum period for the SL transmission may be limited to at most 584 μs.

CO (or COT): CO means that a wireless communication device (e.g., a UE) initiates transmission in a channel and occupies the channel. COT denotes channel occupancy time.

COT sharing: Means that COT initiated by a wireless communication device (e.g., a UE) is shared with the same/different wireless communication device (e.g., see FIG. 15).

SL transmission: SL transmission includes transmission of an SL channel. The SL channel includes a physical sidelink control channel (PSCCH), a physical sidelink shared channel (PSSCH), a physical sidelink feedback channel (PSFCH), and the like.

PSCCH/PSSCH: Denotes a PSSCH and/or a PSSCH.

Sidelink control information (SCI): SCI may be classified into first SCI (or SCI format 1) and second SCI (or SCI format 2). The first SCI is transmitted through a PSCCH. The first SCI is used to schedule (i) a PSSCH and (ii) the second SCI on the PSSCH. For example, the first SCI includes time/frequency resource information for PSSCH reception, a priority indicator, second SCI format information, and the like. The priority indicator indicates the priority of traffic of the PSSCH. The first SCI may be decoded by all UEs in a cell for channel sensing. However, the second SCI is decoded by each receiving UE, and includes remaining information required for decoding the PSSCH. The second SCI may be transmitted using a PSSCH resource. For example, the second SCI includes an HARQ process number, a cast type indicator, a source ID, a destination ID, and the like.

COT Sharing Between SL Channels Transmitted by UE—Intra-UE COT Sharing Between Different SL Channels The disclosure proposes a channel access method and a channel access priority class (CAPC) configuration method that a UE needs to perform for each SL channel when the UE transmits one SL channel or different SL channels in one slot or in consecutive slots.

When a UE supporting sidelink operates in an unlicensed band, channel access is required before transmitting an SL channel. To perform channel access, a channel access type and a channel access priority class (CAPC) may be configured. The disclosure proposes a channel access method that a UE needs to perform (i) when only a PSFCH is transmitted and (ii) when a PSSCH/PSCCH is transmitted sequentially together with a PSFCH (1) in one slot required for PSFCH transmission or (2) in a slot contiguous with a slot required for PSFCH transmission.

First, when only a PSFCH is transmitted in a slot for transmitting a PSFCH, the UE may perform channel access before transmitting the PSFCH, and may transmit the PSFCH when the channel access is successful.

For example, the UE may perform Type 1 channel access, i.e., channel access with random backoff, to transmit only the PSFCH. Here, a method may be considered in which a CAPC used for Type 1 channel access is selected based on the priority of traffic of a previously received PSSCH corresponding to transmission of the PSFCH, i.e., a priority indicator. The UE transmitting the PSFCH may also determine whether to transmit the PSFCH when different SL channels overlap, according to the priority of the traffic of the previously received PSSCH. The UE transmitting the PSFCH is able to know the type of the traffic included in the PSSCH through a PSCCH (SCI) when transmitting the PSCCH/PSSCH, and may thus perform Type 1 channel access, based on the type of the traffic.

In another example, the UE may perform Type 1 channel access, i.e., channel access with random backoff, to transmit only the PSFCH. Here, a CAPC used for Type 1 channel access for the PSFCH may be selected/determined based on a previously received PSSCH corresponding to transmission of the PSFCH. For example, the CAPC for the PSFCH may be selected/determined based on a CAPC value used when Type 1 channel access is performed (by another UE) in transmission of a PSSCH previously received from another UE. Here, the UE transmitting the (previously received) PSSCH may report the type of traffic used for transmitting a PSCCH/PSSCH, instead of reporting the type of traffic included in the PSSCH, through the PSCCH (SCI) when transmitting the PSCCH/PSSCH. The UE receiving the PSCCH/PSSCH may select/determine the CAPC to be used for Type 1 channel access for transmitting the PSFCH, based on the traffic type indicated through the SCI, i.e., the CAPC value used when the UE transmitting the PSCCH/PSSCH performs Type 1 channel access.

In still another example, the UE may perform Type 1 channel access, i.e., channel access with random backoff, to transmit only the PSFCH. Here, a CAPC used for Type 1 channel access for the PSFCH may have a fixed value regardless of a previously received PSSCH corresponding to transmission of the PSFCH. For example, the CAPC for the PSFCH may have the fixed value regardless of a CAPC value used when Type 1 channel access is performed (by another UE) in transmission of a PSSCH previously received from another UE. For example, to maximize a PSFCH transmission occasion, a method of performing Type 1 channel access by configuring a CAPC based on the highest priority value of p=1 may be considered.

Next, proposed are a channel access method and a CAPC configuration method performed by a UE for each SL channel when the UE transmits different SL channels in one slot.

First, in a case of a PSSCH and a PSFCH transmitted in one slot, the PSSCH may have a low-priority traffic type, and regarding the PSFCH, the traffic type of a PSCCH/PSSCH previously received from another UE that corresponds to the PSFCH may have a priority equal to or higher than that of the PSSCH in the slot that the UE currently intends to transmit. In this case, when the UE performs Type 1 channel access for the PSSCH transmitted in the same slot and successfully obtains a channel, the PSSCH is multiplexed with the PSFCH in a TDM mode in an OFDM symbol unit on a PSFCH occasion, and a method may be considered in which a PSFCH transmitted after the PSSCH is transmitted by the Type 2C (i.e., no LBT) method or by the Type 2A or Type 2B method. Here, as a method for filling the gap between the PSSCH and the PSFCH, a method of filling the gap by using CP extension of the PSFCH may be considered. From the perspective of a UE, since the UE is able to know the traffic type of the PSSCH transmitted by the UE and also known the traffic type of the PSSCH corresponding to the PSFCH, the UE may configure the gap between the PSSCH and the PSFCH to less than 16 µs (including no gap) to allow transmission through no LBT when transmitting the PSFCH corresponding to the PSSCH (Type 2C method), or may configure the gap between the PSSCH and the PSFCH to 16 µs to allow transmission through the Type 2B method when transmitting the PSFCH corresponding to the PSSCH. Alternatively, the UE may configure the gap between the PSSCH and the PSFCH to at least 25 µs to allow transmission through the Type 2A method when transmitting the PSFCH corresponding to the PSSCH.

Alternatively, a method of selecting Type 2C, Type 2A, or Type 2B may be considered as a channel access method for transmitting the PSFCH according to the CP extension length of the last OFDM symbol of the PSSCH transmitted by the UE by extending the CP of the last OFDM symbol of the PSSCH. From the perspective of a UE, since the UE is able to know the traffic type of the PSSCH transmitted by the UE and also known the traffic type of the PSSCH corresponding to the PSFCH, the UE may configure the gap between the PSSCH and the PSFCH to less than 16 µs (including no gap) to allow transmission through no LBT when transmitting the PSFCH according to the PSSCH (Type 2C method), or may configure the gap between the PSSCH and the PSFCH to 16 µs to allow transmission through the Type 2B method when transmitting the PSFCH corresponding to the PSSCH. Alternatively, the UE may configure the gap between the PSSCH and the PSFCH to at least 25 µs to allow transmission through the Type 2A method when transmitting the PSFCH corresponding to the PSSCH.

However, when the channel access for transmitting the PSSCH fails, the UE may independently perform separate channel access for transmitting the PSFCH, in which the foregoing methods for transmitting only a PSFCH may be applied.

Next, in a case of a PSSCH and a PSFCH transmitted in one slot, the PSSCH may have traffic of a high priority, and regarding the PSFCH, the traffic type of a PSCCH/PSSCH previously received from another UE that corresponds to the PSFCH may have a priority lower than that of the PSSCH in the slot that the UE currently intends to transmit. In this case, when the UE performs Type 1 channel access for the PSSCH transmitted in the same slot and successfully obtains a channel, the PSSCH is multiplexed with the PSFCH in a TDM mode in an OFDM symbol unit on a PSFCH occasion, and a method may be considered in which a PSFCH transmitted after the PSSCH is transmitted by the Type 2A or Type 2B method. Here, as a method for filling the gap between the PSSCH and the PSFCH, a method of filling the gap by using CP extension of the PSFCH may be considered. From the perspective of a UE, since the UE is able to know the traffic type of the PSSCH transmitted by the UE and also known the traffic type of the PSSCH corresponding to the PSFCH, the UE may configure the gap between the PSSCH and the PSFCH to 16 µs to allow transmission through the Type 2B method when transmitting the PSFCH corresponding to the PSSCH. Alternatively, the UE may configure the gap between the PSSCH and the PSFCH to at least 25 µs to allow transmission through the Type 2A method when transmitting the PSFCH corresponding to the PSSCH.

Alternatively, a method of selecting Type 2A or Type 2B may be considered as a channel access method for the PSFCH according to the CP extension length of the last OFDM symbol of the PSSCH transmitted by the UE by extending the CP of the last OFDM symbol of the PSSCH. From the perspective of a UE, since the UE is able to know the traffic type of the PSSCH transmitted by the UE and also known the traffic type of the PSSCH corresponding to the PSFCH, the UE may configure the gap between the PSSCH and the PSFCH to 16 µs to allow transmission through the Type 2B method when transmitting the PSFCH corresponding to the PSSCH. Alternatively, the UE may configure the gap between the PSSCH and the PSFCH to at least 25 µs to allow transmission through the Type 2A method when transmitting the PSFCH corresponding to the PSSCH.

However, when the channel access for transmitting the PSSCH fails, the UE may independently perform separate channel access for transmitting the PSFCH, in which the foregoing methods for transmitting only a PSFCH may be applied.

Instead of the PSCCH/PSSCH and the PSFCH being configured by TDM in one slot as described above, the PSFCH may be transmitted first in consecutive slots, and the PSCCH/PSSCH may be transmitted in the next slot. Therefore, a channel access method for the PSFCH and the PSCCH/PSSCH transmitted in the next slot needs to be defined. In this case, if the UE is able to know a priority according to the traffic type of the PSCCH/PSSCH to be transmitted next before transmitting the PSFCH, the channel access method may be defined by comparing the priority of a traffic type corresponding to PSFCH transmission with the priority according to the traffic type of the PSCCH/PSSCH.

Figure 25:
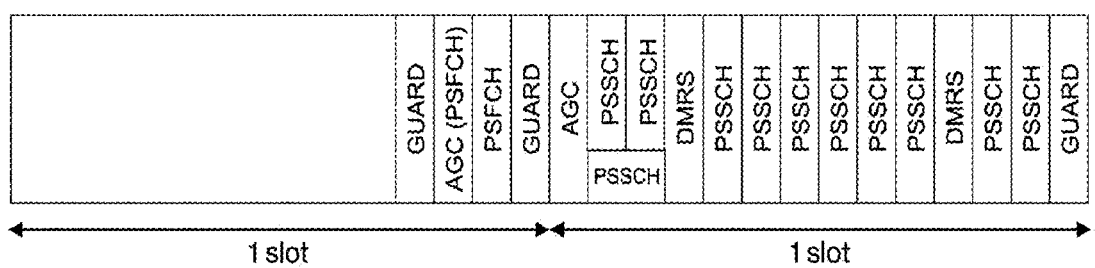

First, as illustrated in FIG. 25, in a case of a PSFCH and a PSSCH transmitted in consecutive slots, the PSSCH may have traffic of a low priority on the time axis, and regarding the PSFCH, the traffic type of a PSCCH/PSSCH previously received from another UE that corresponds to the PSFCH may have a priority equal to or higher than that of the PSSCH in the next slot that the UE currently intends to transmit. In this case, for the PSFCH and the PSCCH/PSSCH in the next slot, when performing channel access in transmission of the PSFCH, the channel access for the PSFCH may be performed with a CAPC value corresponding to the traffic of the low priority corresponding to the PSSCH. Accordingly, in the transmission of the PSFCH and the PSCCH/PSSCH transmitted in the next slot, a method of transmitting the PSCCH/PSSCH by the Type 2C (i.e., no LBT) method or transmitting the PSCCH/PSSCH by the Type 2A or Type 2B method may be considered. Here, as a method for filling the gap between the PSFCH and the PSCCH/PSSCH, a method of filling the gap by using CP extension of the PSCCH/PSSCH may be considered. From the perspective of a UE, since the UE is able to know the traffic type of the PSSCH transmitted by the UE and also known the traffic type of the PSSCH corresponding to the PSFCH, the UE may configure the gap between the PSFCH and the PSCCH/PSSCH to less than 16 µs (including no gap) to allow transmission through no LBT when transmitting the PSCCH/PSSCH corresponding to the PSFCH (Type 2C method), or may configure the gap between the PSFCH and the PSCCH/PSSCH to 16 µs to allow transmission through the Type 2B method when transmitting the PSCCH/PSSCH corresponding to the PSFCH. Alternatively, the UE may configure the gap between the PSCCH/PSSCH to at least 25 µs to allow transmission through the Type 2A method when transmitting the PSCCH/PSSCH corresponding to the PSFCH.

Alternatively, a method of selecting Type 2C, Type 2A, or Type 2B may be considered as a channel access method for transmitting the PSCCH/PSSCH according to the CP extension length of the last OFDM symbol of the PSFCH transmitted by the UE by extending the CP of the last OFDM symbol of the PSFCH. From the perspective of a UE, since the UE is able to know the traffic type of the PSSCH transmitted by the UE and also known the traffic type of the PSSCH corresponding to the PSFCH, the UE may configure the gap between the PSFCH and the PSCCH/PSSCH to less than 16 µs (including no gap) to allow transmission through no LBT when transmitting the PSCCH/PSSCH corresponding to the PSFCH (Type 2C method), or may configure the gap between the PSFCH and the PSCCH/PSSCH to 16 µs to allow transmission through the Type 2B method when transmitting the PSCCH/PSSCH corresponding to the PSFCH. Alternatively, the UE may configure the gap between the PSFCH and the PSCCH/PSSCH to at least 25 µs to allow transmission through the Type 2A method when transmitting the PSCCH/PSSCH corresponding to the PSFCH.

However, when the channel access for transmitting the PSFCH fails, the UE may independently perform separate channel access for transmitting the PSCCH/PSSCH, in which the foregoing methods in which the PSCCH/PSSCH goes ahead on the time axis may be applied.

Next, as illustrated in FIG. 25, in a case of a PSFCH and a PSSCH transmitted in consecutive slots, the PSSCH may have traffic of a high priority on the time axis, and regarding the PSFCH, the traffic type of a PSCCH/PSSCH previously received from another UE that corresponds to the PSFCH may have a priority lower than that of the PSSCH in the next slot that the UE currently intends to transmit. In this case, for the PSFCH and the PSCCH/PSSCH in the next slot, when performing channel access in transmission of the PSFCH, the channel access for the PSFCH may be performed with a CAPC value corresponding to the traffic of the low priority corresponding to the PSFCH. Accordingly, in the transmission of the PSFCH and the PSCCH/PSSCH transmitted in the next slot, a method of transmitting the PSCCH/PSSCH by the Type 2C (i.e., no LBT) method or transmitting the PSCCH/PSSCH by the Type 2A or Type 2B method may be considered. Here, as a method for filling the gap between the PSFCH and the PSCCH/PSSCH, a method of filling the gap by using CP extension of the PSCCH/PSSCH may be considered. From the perspective of a UE, since the UE is able to know the traffic type of the PSSCH transmitted by the UE and also known the traffic type of the PSSCH corresponding to the PSFCH, the UE may configure the gap between the PSFCH and the PSCCH/PSSCH to less than 16 µs (including no gap) to allow transmission through no LBT when transmitting the PSCCH/PSSCH corresponding to the PSFCH (Type 2C method), or may configure the gap between the PSFCH and the PSCCH/PSSCH to 16 µs to allow transmission through the Type 2B method when transmitting the PSCCH/PSSCH corresponding to the PSFCH. Alternatively, the UE may configure the gap between the PSFCH and the PSCCH/PSSCH to at least 25 µs to allow transmission through the Type 2A method when transmitting the PSCCH/PSSCH corresponding to the PSFCH.

Alternatively, a method of selecting Type 2C, Type 2A, or Type 2B may be considered as a channel access method for transmitting the PSCCH/PSSCH according to the CP extension length of the last OFDM symbol of the PSFCH transmitted by the UE by extending the CP of the last OFDM symbol of the PSFCH. From the perspective of a UE, since the UE is able to know the traffic type of the PSSCH transmitted by the UE and also known the traffic type of the PSSCH corresponding to the PSFCH, the UE may configure the gap between the PSFCH and the PSCCH/PSSCH to less than 16 µs (including no gap) to allow transmission through no LBT when transmitting the PSCCH/PSSCH corresponding to the PSFCH (Type 2C method), or may configure the gap between the PSFCH and the PSCCH/PSSCH to 16 µs to allow transmission through the Type 2B method when transmitting the PSCCH/PSSCH corresponding to the PSFCH. Alternatively, the UE may configure the gap between the PSFCH and the PSCCH/PSSCH to at least 25 µs to allow transmission through the Type 2A method when transmitting the PSCCH/PSSCH corresponding to the PSFCH.

However, when the channel access for transmitting the PSFCH fails, the UE may independently perform separate channel access for transmitting the PSCCH/PSSCH, in which the foregoing methods in which the PSCCH/PSSCH goes ahead on the time axis may be applied.

Figure 26:
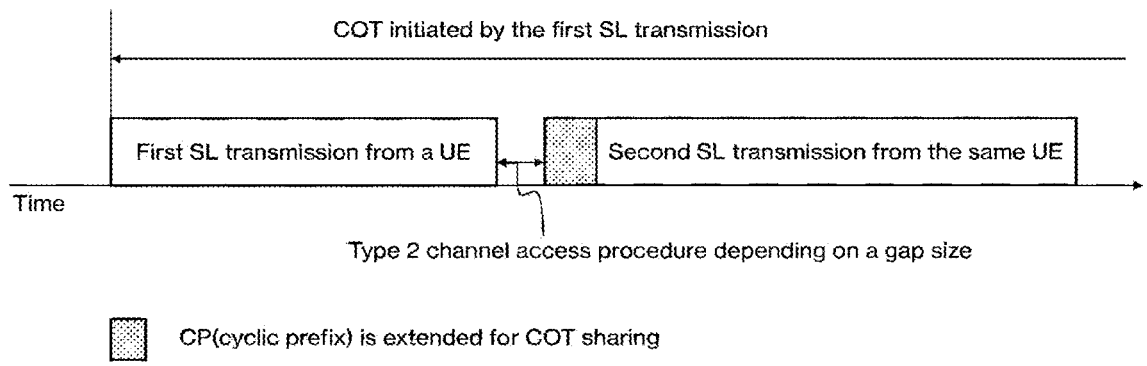

FIG. 26 illustrates an example of SL transmission according to an embodiment of the disclosure. Referring to FIG. 26, a UE may perform first SL transmission and then perform second SL transmission. Here, the SL transmissions may include at least one of a PSCCH, a PSSCH, and a PSFCH. The first SL transmission may be performed based on the Type 1 channel access procedure. COT initiated by the first SL transmission may be shared in the second SL transmission. For COT sharing, CP extension may be applied to the second SL transmission to reduce the gap between the first SL transmission and the second SL transmission, and Type 2 channel access may be performed based on the size of the gap. For example, when COT sharing is applied, the channel access procedure may be performed as follows for the second SL transmission, based on the gap between the first SL transmission and the second SL transmission.

When the gap is 16 μs, the UE may perform PSFCH transmission on a corresponding channel after performing the Type 2B channel access procedure.

When the gap is up to 16 μs (i.e., less than 16 μs), the UE may perform PSFCH transmission on a corresponding channel after performing the Type 2C channel access procedure.

Here, the traffic priorities of the first SL transmission and the second SL transmission may be considered, which has been in detail described above.

Although FIG. 26 illustrates that the COT is initiated by the first SL transmission, the COT may also be initiated by SL transmission of the same UE before the first SL transmission. In this case, the first SL transmission may also be performed through COT sharing.

UE-to-UE COT Sharing Between SL Channels

The disclosure proposes a condition for sharing COT between different UEs and a method for performing COT sharing.

The disclosure proposes a method in which a UE receiving a PSCCH/PSSCH or transmitting a PSFCH and a UE transmitting the PSCCH/PSSCH perform transmission when an SL supporting UE that transmits a PSCCH/PSSCH as an SL channel initiates channel occupancy (CO) (or channel occupancy time (COT)) and shares the COT with another UE, and operating methods of a transmitting UE and a receiving UE according to the method. In addition, the disclosure proposes a method in which a UE receiving a PSFCH and a UE transmitting the PSFCH perform transmission when the UE receiving a PSCCH/PSSCH or transmitting the PSFCH initiates CO (or COT) and shares the COT with another UE, and operating methods of a transmitting UE and a receiving UE according to the method.

First, proposed are a condition for sharing COT between a UE performing PSCCH/PSSCH transmission including unicast transmission configured to expect ACK/NACK feedback as an HARQ-ACK and a single UE performing PSFCH transmission including ACK/NACK feedback as an HARQ-ACK corresponding to a PSSCH, and a method in which a UE receiving a PSCCH/PSSCH or transmitting a PSFCH and a UE transmitting the PSCCH/PSSCH perform transmission. In addition, proposed are a condition for sharing COT between a UE performing PSCCH/PSSCH transmission including groupcast transmission configured to expect NACK-only feedback as an HARQ-ACK and a UE group performing PSFCH transmission including NACK-only feedback as an HARQ-ACK corresponding to a PSSCH, and a method in which a UE receiving a PSCCH/PSSCH or transmitting a PSFCH and a UE transmitting the PSCCH/PSSCH perform transmission.

First, when a UE that intends to transmit a PSCCH/PSSCH operates as an initiating device, a method for enabling another UE to recognize the COT initiated by the UE may be needed to share the COT initiated by the UE with the other UE. In SL, the UE may indicate a priority indicator through SCI (e.g., first SCI). In this specification, the UE that intends to transmit the PSCCH/PSSCH may perform channel access by configuring a CAPC used for channel access, based on the priority indicator, may configure a maximum COT (MCOT) value suitable for the CAPC, and may configure COT that does not exceed the MCOT. If the UE operating as the initiating device transmits one or more PSCCHs/PSSCHs, the UE may perform channel access for transmitting the one or more PSCCHs/PSSCHs by configuring the highest CAPC value (e.g., the lowest priority value) among CAPCs configured based on one or more priority indicators, and may transmit the one or more PSCCHs/PSSCHs when the channel access is successful. Here, the length of the COT starting from transmission of the PSCCH/PSSCH needs to be informed to be shared with the other UE. To this end, implicit signaling and explicit signaling may be used as signaling methods.

First, an implicit signaling method is described. The UE receiving the PSCCH may recognize the CAPC value configured by the UE transmitting the PSCCH/PSSCH, based on the priority indicator in the SCI (e.g., the first SCI) transmitted through the PSCCH. Accordingly, the UE receiving the PSCCH/PSSCH may determine whether the COT is shared based on the MCOT according to the corresponding CAPC, and may determine whether transmission of a PSFCH corresponding to the PSSCH is within a COT sharing period.

Table 6 illustrates an example of a parameter value used for channel access by channel access priority class (CAPC) for SL transmission.

TABLE 6

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms [or 10 ms] | {15, 31, 63, 127, 255, 511, 1023} |
| 4 | 7 | 15 | 1023 | 6 ms [or 10 ms] | {15, 31, 63, 127, 255, 511, 1023} |

[NOTE1:

For p = 3, 4, $T_{ulm\ cot,p}$ = 10 ms if the higher layer parameter absenceOfAnyOtherTechnology-r14 or absenceOfAnyOtherTechnology-r16 is provided, otherwise, $T_{ulm\ cot,p}$ = 6 ms.
NOTE 2:

When $T_{ulm\ cot,p}$ = 6 ms it may be increased to 8 ms by inserting one or more gaps. The minimum duration of a gap shall be 100 μs. The maximum duration before including any such gap shall be 6 ms.

When there is a PSFCH occasion for PSFCH transmission within the COT sharing period, the UE receiving the PSCCH/PSSCH may be provided with the COT shared when transmitting the PSFCH. When the COT is shared, the UE receiving the PSCCH/PSSCH may perform channel access of the Type 2 series (e.g., 2A/2B/2C) instead of Type 1 channel access with random backoff when transmitting the PSFCH to the UE transmitting the PSCCH/PSSCH. Which one to select from among Type 2A, 2B, or 2C when transmitting the PSFCH may be determined according to the gap between (a) the PSCCH/PSSCH transmitted by the UE transmitting the PSCCH/PSSCH and (b) the PSFCH transmitted by the UE transmitting the PSFCH.

When the gap is 25 µs or more, the UE may perform PSFCH transmission on a corresponding channel after performing the Type 2A channel access procedure.

When the gap is 16 µs, the UE may perform PSFCH transmission on a corresponding channel after performing the Type 2B channel access procedure.

When the gap is up to 16 µs (i.e., less than 16 µs), the UE may perform PSFCH transmission on a corresponding channel after performing the Type 2C channel access procedure.

In addition, the UE operating as the initiating device may transmit one or more PSCCHs/PSSCHs. In this case, the UE may perform channel access for transmitting the one or more PSCCHs/PSSCHs by configuring the highest CAPC value (e.g., the lowest priority value) among CAPCs configured based on one or more priority indicators, and may transmit the one or more PSCCHs/PSSCHs when the channel access is successful.

Here, since the COT may determine a slot occupied by the PSCCH/PSSCH according to traffic that the UE wants to transmit, the COT may be freely configured within the MCOT. Therefore, when the UE receiving the PSCCH/PSSCH configures the shared COT for PSFCH transmission to the MCOT and uses the COT for channel access for the PSFCH transmission, there may be a mismatch in criteria for the shared COT between the UEs. To resolve this problem, a method of indicating whether to share the COT through the SCI (e.g., the first SCI transmitted through the PSCCH) may be considered as explicit signaling. When PSCCH/PSSCH transmission and PSFCH transmission occur in the same cell, a PSFCH occasion in a sidelink is basically configured cell-specifically. That is, when different UEs intend to transmit a PSFCH, an occasion for transmitting the PSFCH is configured equally for each cell. Accordingly, since the UE transmitting the PSCCH/PSSCH is able to know time when the PSFCH that the UE transmitting the PSCCH/PSSCH expects to receive is transmitted from the UE, the UE may inform the UE performing the PSFCH transmission of COT sharing information through explicit signaling (e.g., the first SCI) when transmitting the PSCCH. When there is a PSFCH occasion for PSFCH transmission within a COT sharing period identified based on reception of the COT sharing information, the UE performing the PSFCH transmission may be provided with the shared COT when transmitting the PSFCH. When the COT is shared, the UE performing the PSFCH transmission may perform channel access of Type 2 series (e.g., 2A/2B/2C) instead of Type 1 channel access with random backoff when transmitting the PSFCH to the UE transmitting the PSCCH/PSSCH. Which one to select from among Type 2A, 2B, or 2C when transmitting the PSFCH may be determined based on the gap between (a) the PSCCH/PSSCH transmitted by the UE transmitting the PSCCH/PSSCH and (b) the PSFCH transmitted by the UE transmitting the PSFCH.

When the gap is 25 µs or more, the UE may perform PSFCH transmission on a corresponding channel after performing the Type 2A channel access procedure.

When the gap is 16 µs, the UE may perform PSFCH transmission on a corresponding channel after performing the Type 2B channel access procedure.

When the gap is up to 16 µs (i.e., less than 16 µs), the UE may perform PSFCH transmission on a corresponding channel after performing the Type 2C channel access procedure.

In addition, COT sharing may be allowed only when SL transmissions of different UEs are within the same RB set. For example, only when second SL transmission (e.g., PSFCH transmission) after first SL transmission (e.g., PSCCH/PSSCH transmission) is within the same RB set as the PSCCH/PSSCH transmission, it may be notified to perform COT sharing (by the UE operating as the initiating device to the other UE) through COT sharing information. Here, the RB set corresponds to a unit for performing different channel accesses (when an intra guard subcarrier configuration is received), for example, an LBT BW in the frequency domain, i.e., a channel unit in which LBT is performed. The RB set includes a plurality of consecutive RBs. That is, COT sharing may be restricted in different channel access units. Since fair coexistence with different RATs, such as Wi-Fi, LAA, and NR-U, is required due to characteristics of an unlicensed band, COT sharing may be allowed only within an RB set in which a UE performs channel access, enabling coexistence with other RATs.

Figure 24:
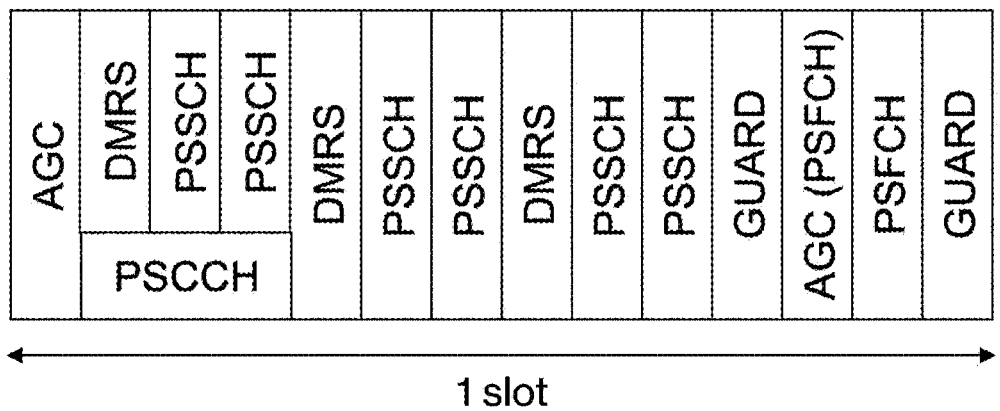
FIGS. 24 to 28 illustrate examples of a channel access method according to the disclosure.

FIG. 24 illustrates an example of the configuration of a PSCCH/PSSCH/PSFCH in a slot. Referring to FIG. 24, the temporal position of a PSFCH within a slot may be time-division-multiplexed with a PSCCH/PSSCH. Accordingly, UE 2 transmitting an SL channel (e.g., a PSCCH/PSSCH/PSFCH) in a PSFCH occasion may be scheduled in a slot continuous with a PSCCH/PSSCH that UE 1 transmits by initiating COT or in a slot which is noncontiguous with a time gap but in which COT sharing is possible. In this case, the SL channel (e.g., the PSCCH/PSSCH/PSFCH) transmitted by UE 2 may be transmitted by sharing the COT initiated by UE 1. However, when the SL transmission (e.g., the PSCCH/PSSCH/PSFCH) transmitted by UE 2 includes at least transmission for UE 1, the SL transmission transmitted by UE 2 may be allowed to be transmitted by applying COT sharing thereto. That is, when the SL transmission transmitted by UE 2 does not include transmission for UE1, COT sharing is not applied to the SL transmission transmitted by UE 2.

When COT sharing is applied to the SL transmission transmitted by UE 2, UE 2 may perform channel access of the Type 2 series (e.g., 2A/2B/2C) instead of Type 1 channel access with random backoff when transmitting the SL transmission (e.g., the PSCCH/PSSCH/PSFCH). Which one to select from among Type 2A, 2B, or 2C when transmitting the SL transmission (e.g., PSCCH/PSSCH/PSFCH) may be determined according to the gap between (a) the PSCCH/PSSCH transmitted by UE 1 and (b) the SL transmission (e.g., the PSCCH/PSSCH/PSFCH) transmitted by UE 2.

When the gap is 25 µs or more, UE 2 may perform the SL transmission (e.g., the PSCCH/PSSCH/PSFCH) on a corresponding channel after performing the Type 2A channel access procedure.

When the gap is 16 µs, UE 2 may perform the SL transmission on a corresponding channel after performing the Type 2B channel access procedure.

When the gap is up to 16 µs (i.e., less than 16 µs), UE 2 may perform the SL transmission on a corresponding channel after performing the Type 2C channel access procedure.

Figure 27:
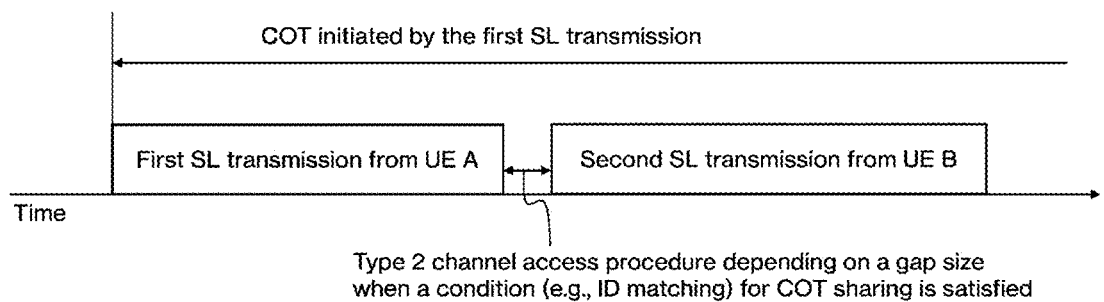

FIG. 27 illustrates an example of a signal transmission process according to an embodiment of the disclosure. Referring to FIG. 27, UE A may perform first SL transmission (e.g., a PSCCH/PSSCH). The first SL transmission may be transmitted based on the Type 1 channel access procedure. UE B may receive the first SL transmission from UE A, and may intend second SL transmission (e.g., PSCCH/PSSCH/PSFCH) after receiving the first SL transmission. Here, when a COT sharing condition is satisfied, UE B may perform the Type 2 channel access procedure, based on the gap between the first SL transmission and the second SL transmission, to transmit the second SL transmission. The COT sharing condition may include at least the following:

a) The second SL transmission existing within a COT sharing period;
b) The second SL transmission existing in the same RB set as the first SL transmission; and
c) The second SL transmission including transmission for UE A.

Here, a) to c) may be identified using information in SCI. The SCI may correspond to the PSSCH in the first SL transmission. For example, information about a) may be obtained through CO sharing information in the SCI (e.g., first SCI). Information about b) may be obtained through frequency resource allocation information in the SCI (e.g., the first SCI). Information about b) (e.g., whether COT is shared according to an RB set) may also be included in the CO sharing information. Information about c) may be obtained through ID information (e.g., a source ID and a destination ID) in the SCI (e.g., second SCI). The UE may determine whether condition c) is satisfied, based on whether ID information related to the first SL transmission matches ID information related to the second SL transmission (i.e., ID matching).

When the COT sharing condition is satisfied, transmission of the second SL transmission may be attempted according to a CAP based on a fixed sensing period (e.g., the Type 2 CAP), rather than a CAP based on random backoff (e.g., the Type 1 CAP). For example, when the COT sharing condition is satisfied, the transmission of the second SL transmission may be attempted based on the gap between the first SL transmission and the second SL transmission according to the following:

CAP based on a fixed sensing period of 25 µs when the gap is at least 25 µs;
CAP based on a fixed sensing period of 16 µs when the gap is 16 µs; and
CAP without channel sensing when the gap is less than 16 µs.

When the COT sharing condition is not satisfied, the transmission of the second SL transmission may be attempted according to the CAP based on random-backoff (e.g., the Type 1 CAP).

Although FIG. 27 illustrates that the COT is initiated by the first SL transmission of UE A, the COT may also be initiated by previous SL transmission of UE A. In this case, the first SL transmission of UE A may also be transmitted through COT sharing according to the Type 2 channel access procedure (intra-UE COT sharing, see FIG. 26).

Next, the disclosure proposes a method in which a UE initiating COT initiates/shares the COT when transmitting an S-SSB or a PSFCH and a COT sharing condition as another method for performing COT sharing and a condition for different UEs to share COT.

Figure 28:
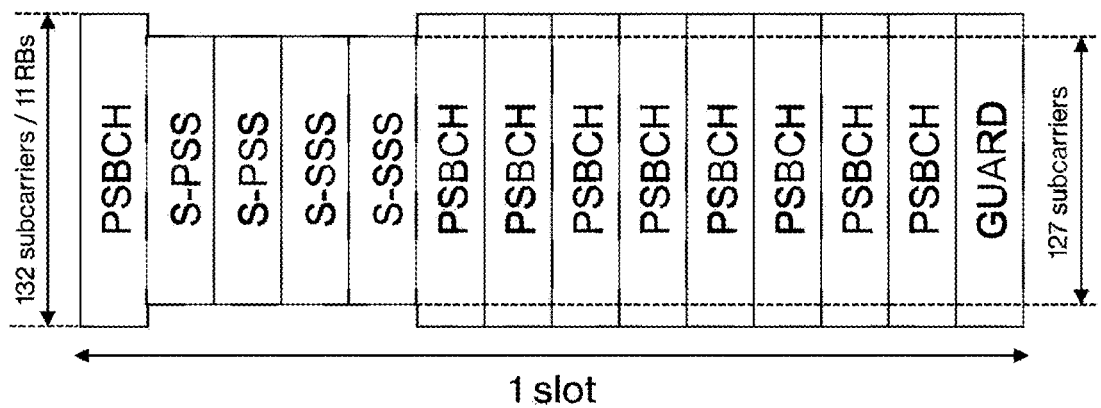

FIG. 28 illustrates an example of the structure of a sidelink SSB (S-SSB) in a normal CP (NCP) in an NR SL slot format. Referring to FIG. 28, a UE may transmit an S-SSB to perform synchronization with other UEs through a sidelink. The example of FIG. 28 may be combined with various embodiments of the disclosure. For example, when the CP type is an NCP, the order of symbols to which an S-PSS, an S-SSS, and a PSBCH are mapped within the S-SSB may refer to FIG. 28. For example, when the CP type is an extended CP (ECP), the number of symbols to which the PSBCH is mapped after the S-SSS within the S-SSB may be 6 unlike in FIG. 28. Accordingly, the coverage of the S-SSB may vary depending on whether the CP type is the NCP or the ECP. To ensure the coverage of the S-SSB, it is needed to define, configure, or preconfigure the number of S-SSBs that a transmitting UE transmits to a receiving UE within one S-SSB transmission period or a set for selecting/determining the number of S-SSBs that the transmitting UE transmits to the receiving UE within one S-SSB transmission period.

In more detail, a sidelink synchronization signal (SL synchronization signal (SLSS)) and synchronization information are described. The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 Gold sequences may be used for the S-SSS. For example, a UE may detect an initial signal and obtain synchronization by using the S-PSS. For example, the UE may obtain detailed synchronization and detect a synchronization signal ID by using the S-PSS and the S-SSS. A physical sidelink broadcast channel (PSBCH) may be a (broadcast) channel on which basic information (e.g., system information) that the UE needs to know first before transmitting and receiving an SL signal is transmitted. For example, the basic information may be information related to an SLSS, a duplex mode (DM), a time division duplex uplink/downlink (TDD UL/DL) configuration, resource pool-related information, the type of an application related to the SLSS, a subframe offset, broadcast information, and the like. For example, to evaluate of the performance of the PSBCH, in NR V2X, the payload size of the PSBCH may be 56 bits including a 24-bit cyclic redundancy check (CRC). The S-PSS, the S-SSS, and the PSBCH may be included in a block format supporting periodic transmission (e.g., a SLSS/PSBCH block, hereinafter referred to as an S-SSB). The S-SSB may have the same numerology (e.g., SCS and CP length) as a PSCCH/PSSCH in a carrier, and the transmission bandwidth of the S-SSB may be within a (pre)configured sidelink BWP (SL BWP). For example, the bandwidth of the S-SSB may be 11 RBs. For example, the PSBCH may span 11 RBs. The frequency position of the S-SSB may be (pre-)configured. Therefore, the UE does not need to perform hypothesis detection in the frequency to discover the S-SSB from the carrier.

In this specification, for example, a transmitting UE (TX UE) may be a UE that transmits data to a (target) receiving UE (RX UE). For example, the transmitting UE may be a UE that performs PSCCH and/or PSSCH transmission. In addition, the transmitting UE may be a UE that transmits an SL CSI-RS and/or an SL CSI report request indicator to the (target) receiving UE. Further, the transmitting UE may be a UE that transmits a (control) channel (e.g., a PSCCH or a PSSCH) and/or a reference signal (e.g., a DM-RS or a CSI-RS) on the (control) channel to be used for SL radio link monitoring (RLM) and/or SL radio link failure (RLF) operations of the (target) receiving UE. In addition, the transmitting UE may be a UE that transmits an S-SSB or an SLSS/PSBCH block to the (target) receiving UE. In this specification, for example, a receiving UE (RX UE) may be a UE that transmits SL HARQ feedback to a transmitting UE (TX UE) according to whether decoding of data received from a transmitting UE is successful and/or whether detection/decoding of a PSCCH (related to PSSCH scheduling) transmitted by the transmitting UE is successful. Further, the receiving UE may be a UE that performs SL CSI transmission to the transmitting UE, based on an SL CSI-RS and/or an SL CSI report request indicator received from the transmitting UE. In addition, the receiving UE may be a UE that transmits an SL (L1) RSRP measurement value measured based on a (predefined) reference signal and/or an SL (L1) RSRP report request indicator received from the transmitting UE to the TX UE. Furthermore, the receiving UE may be a UE that transmits data of the receiving UE to the transmitting UE. In addition, the receiving UE may be a UE that performs SL RLM and/or SL RLF operations, based on a (predefined) (control) channel received from the transmitting UE and/or a reference signal on the (control) channel. Further, the RX UE may be a UE that receives an S-SSB or an SLSS/PSBCH block from the TX UE and performs synchronization.

In an NR sidelink communication system, a transmitting UE may transmit an S-SSB or an SLSS/PSBCH block to a receiving UE. The receiving UE may perform initial access by using the S-SSB or the SLSS/PSBCH block received from the transmitting UE. The S-SSB or the SLSS/PSBCH block may include an S-PSS, an S-SSS, and a PSBCH. The receiving UE may obtain initial signal detection and synchronization by using the S-PSS received from the transmitting UE. The receiving UE may obtain detailed synchronization and detect a synchronization signal ID by using both the S-SSS and the S-PSS received from the transmitting UE. The receiving UE may receive a master information block (MIB) through the PSBCH received from the transmitting UE, and may obtain basic system information included in the MIB. Therefore, the S-PSS, the S-SSS, and the PSBCH included in the S-SSB or the SLSS/PSBCH block may be very important signals for the receiving UE to obtain the synchronization and the basic system information, and for normal data communication, the receiving UE may need to initially receive and decode the S-SSB. In the NR SL system, a plurality of numerologies having different SCSs and/or CP lengths may be supported. As the size of SCS increases, the length of a time resource for the transmitting UE to transmit the S-SSB may decrease, thus reducing the coverage of the S-SSB. Therefore, to guarantee the coverage of the S-SSB, the number of S-SSBs transmitted by the transmitting UE to the receiving UE within an S-SSB transmission period (e.g., 160 ms) may be preconfigured or configured to one or more for the transmitting UE according to the size of SCS. For example, when the size of SCS is 15 kHz, the transmitting UE may transmit one S-SSB to the receiving UE within one S-SSB transmission period. For example, when the size of SCS is 30 kHz, the transmitting UE may transmit one or two S-SSBs to the receiving UE within one S-SSB transmission period. In this specification, the S-SSB transmission period may be referred to as an S-SSB period. When the size of SCS is 60 kHz, two types of CPs may be supported. The structure of the S-SSB transmitted by the transmitting UE to the receiving UE may be change depending on the CP types. Here, the CP types may include a normal CP (NCP) or an extended CP (ECP). For example, when the CP type is the NCP, the number of symbols to which the PSBCH is mapped within the S-SSB may be 9 or 8. When the CP type is the ECP, the number of symbols to which the PSBCH is mapped within the S-SSB may be 7 or 6.

When the transmitting UE transmits an S-SSB in an unlicensed band, a method may be considered in which at least one last OFDM symbol starting from the last symbol in one slot in an S-SSB structure configured in the slot may be left empty as a gap to perform LBT for channel access so that the starting symbol in the next successive slot may be used as a PSCCH/PSSCH transmission symbol or an automatic gain control (AGC) symbol.

COT Sharing Between S-SSB Transmission and PSCCH/PSSCH for Same UE

From the perspective of one UE, when a PSSCH or a PSCCH is scheduled or a transmission resource is configured to be transmitted successively after transmission of an S-SSB, the Type-1 channel access method may be applied as a channel access method only for S-SSB transmission to transmit the S-SSB. When a CAPC for the S-SSB transmission is applied with a value of p=1, the length of MCOT corresponding to p=1 may be configured to 2 ms (see Table 6). In this case, the UE may consider PSSCH/PSCCH transmission successively transmitted in a slot in which the S-SSB is transmitted as transmission within the MCOT, thus considering the transmission as transmission within shared COT when performing channel access. Here, the transmitting UE may perform channel access by using any one of the Type 2A, 2B, or 2C channel access procedures according to the gap between the S-SSB transmission and the PSSCH/PSCCH transmission. That is, which one to select from among the Type 2A, 2B, or 2C channel access procedures when transmitting a PSCCH/PSSCH may be determined according to the gap since the UE transmitting the S-SSB and the UE transmitting the PSCCH/PSSCH are the same.

When the gap is 25 μs or more, the UE may perform SL transmission (e.g., the PSCCH/PSSCH) on a corresponding channel after performing the Type 2A channel access procedure.

When the gap is 16 μs, the UE may perform SL transmission on a corresponding channel after performing the Type 2B channel access procedure.

When the gap is up to 16 μs (i.e., less than 16 μs), the UE may perform SL transmission on a corresponding channel after performing the Type 2C channel access procedure.

In addition, from the perspective of the same UE, a PSSCH/PSCCH may be scheduled or a transmission resource may be configured to be transmitted successively after transmission of an S-SSB. In this case, the second last symbol of a slot included in the S-SSB transmission may be repeatedly transmitted in the last guard symbol, or a first symbol of the next slot may be allocated to the last guard symbol through CP extension. Here, the second last symbol of the slot may be repeatedly transmitted in the last guard symbol, or the first symbol of the next slot may be allocated to the last guard symbol through CP extension. The gap between the two slots may be configured considering various methods. For example, the gap may be configured to 16 μs (or less) so that the UE transmitting the PSCCH/PSSCH may perform the Type 2B or Type 2C channel access procedure, or the gap may be configured to 25 μs (or more) so that the UE may perform the Type 2A channel access procedure. Accordingly, the PSSCH/PSCCH transmission configured to be successively transmitted after the S-SSB transmission may be prevented from colliding with transmission in a guard symbol of the same RAT or another RAT sharing a channel of the same unlicensed band. This is because when the guard symbol is empty, the same RAT or the other RAT coexisting in the same unlicensed band may determine the channel as idle in the guard symbol and thus perform transmission.

In another example, from the perspective of one UE, a PSSCH/PSCCH may be scheduled to be successively transmitted after transmission of an S-SSB. In this case, Type-1 channel access may be applied to S-SSB transmission as a channel access method only for the S-SSB transmission, and Type-1 channel access may be performed according to a CAPC value corresponding to the traffic of the PSSCH/PSCCH successively transmitted. Accordingly, Type-1 channel access may be performed according to the CAPC value corresponding to the traffic of the PSSCH/PSCCH before the transmission of the S-SSB, and the S-SSB transmission and the PSCCH/PSSCH transmission may be successively transmitted without performing additional channel access. For the gap between the two slots, the second last symbol of a slot included in the S-SSB transmission may be repeatedly transmitted in the last guard symbol, or a first symbol of the next slot may be allocated to the last guard symbol through CP extension. The gap between the two slots may be configured considering various methods described above. However, even though Type-1 channel access is performed according to the CAPC value corresponding to the traffic of the PSSCH/PSCCH before the S-SSB transmission, the channel access may fail. In this case, channel access may be configured to be additionally performed according to the CAPC value corresponding to the traffic of the PSSCH/PSCCH before the slot configured for the PSSCH/PSCCH transmission.

Case of Sharing COT of S-SSB with Different UE

When COT is shared with a different UE, a method in which a UE performing S-SSB transmission is configured not to share the COT with the different UE for S-SSB transmission may be considered. Considering S-SSB transmission not including transmission of unicast data and transmission characteristics of broadcast or groupcast, when the different UE(s) receiving an S-SSB performs Type 2A/2B/2C channel access (i.e., performs transmission on a channel without a random backoff operation for channel sensing) instead of performing Type-1 channel access, a collision between different UEs may occur due to transmissions between the different UEs on the same channel. As a result, efficient communication may not be achieved, and the number of retransmissions may increase, thus increasing latency between links.

In addition, when COT is shared with a different UE, a method may be considered in which a value of p=1 (see Table 6) is used as a CAPC for S-SSB transmission but a UE performing the S-SSB transmission is configured not to share the COT with the different UE only in a case where the S-SSB transmission is given a higher priority than transmission with the conventionally defined CAPC value of p=1 by setting $m_p$=1 instead of $m_p$=2 and is prioritized. Transmissions of channels including unicast data having p=1 as a CAPC value and S-SSB transmission equally having p=1 may fairly compete to obtain a channel by performing channel access on the same channel, thereby allowing COT sharing within the same MCOT. However, the S-SSB transmission that has the same CAPC value of p=1 but is prioritized by setting $m_p$=1 instead of $m_p$=2 may be allowed to be preferentially transmitted. However, the S-SSB transmission is merely prioritized, and a channel is not obtained through fair competition with other UEs on the same RAT or fair competition with other UEs on different RATs, thus configuring the COT not to be shared within the MCOT.

Case of Sharing COT of PSFCH with Same UE

From the perspective of one UE, a PSSCH/PSCCH may be scheduled or a transmission resource may be configured to be successively transmitted after transmission of a PSFCH. In this case, Type-1 channel access may be applied to the PSFCH transmission as a channel access method only for the PSFCH transmission. When a CAPC for the PSFCH transmission is applied with a value of p=1 and the length of MCOT corresponding to p=1 is configured to 2 ms (see Table 6), PSSCH/PSCCH transmission successively transmitted in a slot in which the PSFCH is transmitted may be considered as transmission within the MCOT. Therefore, the PSSCH/PSCCH transmission may be considered as transmission within shared COT when performing channel access, and a channel access type (e.g., Type 2A, 2B, or 2C) may be determined according to the gap between (a) the PSFCH transmission and (b) the PSSCH/PSCCH transmission to perform the channel access. Which one selected from among Type 2A, 2B, or 2C when transmitting the PSCCH/PSSCH may be determined according to the gap since the UE transmitting the PSFCH and the UE transmitting the PSCCH/PSSCH are the same.

When the gap is 25 μs or more, the UE may perform SL transmission (e.g., the PSCCH/PSSCH) on a corresponding channel after performing the Type 2A channel access procedure.

When the gap is 16 μs, the UE may perform SL transmission on a corresponding channel after performing the Type 2B channel access procedure.

When the gap is up to 16 μs (i.e., less than 16 μs), the UE may perform SL transmission on a corresponding channel after performing the Type 2C channel access procedure.

In addition, from the perspective of the same UE, a PSSCH/PSCCH may be scheduled or a transmission resource may be configured to be transmitted successively after transmission of a PSFCH. In this case, the second last symbol of a slot including the PSFCH transmission may be repeatedly transmitted in the last guard symbol, or a first symbol of the next slot may be allocated to the last guard symbol through CP extension. The gap between the two slots may be configured considering various methods. For example, the gap may be configured to 16 μs so that the UE transmitting the PSCCH/PSSCH may perform the Type 2B or Type 2C channel access procedure, or the gap may be configured to 25 μs so that the UE may perform the Type 2A channel access procedure. Accordingly, the PSSCH/PSCCH transmission configured to be successively transmitted after the S-SSB transmission may be prevented from colliding with transmission in a guard symbol of the same RAT or another RAT sharing a channel of the same unlicensed band. This is because when the guard symbol is empty, the same RAT or the other RAT coexisting in the same unlicensed band may determine the channel as idle in the guard symbol and thus perform transmission.

In another example, from the perspective of one UE, a PSSCH/PSCCH may be scheduled to be successively transmitted after transmission of a PSFCH. In this case, Type-1 channel access may be applied to PSFCH transmission as a channel access method only for the PSFCH transmission, and Type-1 channel access may be performed according to a CAPC value corresponding to the traffic of the PSSCH/

PSCCH successively transmitted. Accordingly, Type-1 channel access may be performed according to the CAPC value corresponding to the traffic of the PSSCH/PSCCH before the transmission of the PSFCH, and the PSFCH transmission and the PSCCH/PSSCH transmission may be successively transmitted without performing additional channel access. For the gap between the two slots, the second last symbol of a slot including the PSFCH transmission may be repeatedly transmitted in the last guard symbol, or a first symbol of the next slot may be allocated to the last guard symbol through CP extension. The gap between the two slots may be configured considering various methods described above. However, even though Type-1 channel access is performed according to the CAPC value corresponding to the traffic of the PSSCH/PSCCH before the PSFCH transmission, the channel access may fail. In this case, channel access may be additionally performed according to the CAPC value corresponding to the traffic of the PSSCH/PSCCH before the slot configured for the PSSCH/PSCCH transmission.

Case of Sharing COT of PSFCH with Different UE

In another example of the disclosure, a method similar to that for S-SSB transmission may be used for PSFCH transmission transmitted by a UE. When COT is shared with a different UE, a method in which a UE performing PSFCH transmission is configured not to share the COT with the different UE for PSFCH transmission may be considered. Considering a characteristic of PSFCH transmission not including transmission of unicast data, when the transmitting UE performs the PSFCH transmission and the different UE(s) receiving a PSFCH performs transmission on a channel without a random backoff operation for channel sensing, such as Type 2A/2B/2C, instead of performing Type-1 channel access, a collision between different UEs may occur due to transmissions between the different UEs on the same channel. As a result, efficient communication may not be achieved, and the number of retransmissions may increase, thus increasing latency between links.

In another example, when COT is shared with a different UE, a method may be considered in which a value of p=1 (see Table 6) is used as a CAPC for PSFCH transmission but a UE performing the PSFCH transmission is configured not to share the COT with the different UE only in a case where the PSFCH transmission is given a higher priority than transmission with the conventionally defined CAPC value of p=1 by setting $m_p=1$ instead of $m_p=2$ and is prioritized. Transmissions of channels including unicast data having p=1 as a CAPC value and PSFCH transmission equally having p=1 may fairly compete to obtain a channel by performing channel access on the same channel, thereby allowing COT sharing within the same MCOT. However, the PSFCH transmission has the same CAPC value of p=1 but may be allowed to be preferentially transmitted by setting $m_p=1$ instead of $m_p=2$. However, the PSFCH transmission is merely prioritized, and a channel is not obtained through fair competition with other UEs on the same RAT or fair competition with other UEs on different RATs, thus configuring the COT not to be shared within the MCOT.

Although the method and system of the present invention have been described in connection with specific embodiments, some or all of components or operations thereof may be implemented using a computing system having a general-purpose hardware architecture.

The description of the present invention described above is only exemplary, and it will be understood by those skilled in the art to which the present invention pertains that various modifications and changes can be made without changing the technical spirit or essential features of the present invention. Therefore, it should be construed that the embodiments described above are illustrative and not restrictive in all respects. For example, each component described as a single type may be implemented in a distributed manner, and similarly, components described as being distributed may also be implemented in a combined form.

The scope of the present invention is indicated by the attached claims rather than the detailed description, and it should be construed that all changes or modifications derived from the meaning and scope of the claims and their equivalents are included in the scope of the present invention.

The invention claimed is:

1. A user equipment (UE) configured to operate in a wireless communication system, the UE comprising:
a communication module; and
a processor configured to control the communication module,
wherein the processor is configured to:
receive sidelink control information (SCI) comprising channel occupancy (CO) sharing information from a first UE;
receive a first sidelink (SL) transmission including a physical sidelink shared channel (PSSCH) from the first UE within a resource block (RB) set; and
after receiving the first SL transmission, attempt to transmit a second sidelink (SL) transmission including a plurality of SL channels within a physical sidelink feedback channel (PSFCH) transmission occasion by using a channel access procedure (CAP),
wherein the CAP is performed without a random backoff when a condition is satisfied, the condition comprising:
the second SL transmission exists within a CO sharing period based on the CO sharing information;
the second SL transmission exists within the RB set; and
any one of the plurality of SL channels in the second SL transmission is to be transmitted to the first UE.

2. The UE of claim 1, wherein, when no one of the plurality of SL channels in the second SL transmission is to be transmitted to the first UE, the CAP is performed based on the random backoff.

3. The UE of claim 1, wherein, when the condition is satisfied, the CAP is performed based on a gap between the first SL transmission and the second SL transmission in the CO sharing period, as follows:
the CAP is performed based on channel sensing within a fixed sensing period of 25 μs when the gap is at least 25 μs;
the CAP is performed based on channel sensing within a fixed sensing period of 16 μs when the gap is 16 μs; and
the CAP is performed without channel sensing when the gap is less than 16 μs.

4. The UE of claim 1, wherein the second SL transmission comprises physical sidelink control channel (PSCCH)/PSSCH.

5. The UE of claim 1, wherein the second SL transmission comprises PSFCH.

6. The UE of claim 1, wherein, when the condition is not satisfied, the CAP is performed based on the random backoff.

7. The UE of claim 1, wherein the wireless communication system comprises a 3rd generation partnership project (3GPP) new radio (NR)-based wireless communication system.

8. A method performed by a user equipment (UE) configured to operate in a wireless communication system, the method comprising:
- receiving sidelink control information (SCI) comprising channel occupancy (CO) sharing information from a first UE;
- receiving a first sidelink (SL) transmission including a physical sidelink shared channel (PSSCH) from the first UE within a resource block (RB) set; and
- after receiving the first SL transmission, attempting to transmit a second sidelink (SL) transmission including a plurality of SL channels within a physical sidelink feedback channel (PSFCH) transmission occasion by using a channel access procedure (CAP),
- wherein the CAP is performed without a random backoff when a condition is satisfied, the condition comprising:
- the second SL transmission exists within a CO sharing period based on the CO sharing information;
- the second SL transmission exists within the RB set; and
- any one of the plurality of SL channels in the second SL transmission is to be transmitted to the first UE.

9. The method of claim 8, wherein, when no one of the plurality of SL channels in the second SL transmission is to be transmitted to the first UE, the CAP is performed based on random backoff.

10. The method of claim 8, wherein, when the condition is satisfied, the CAP is performed based on a gap between the first SL transmission and the second SL transmission in the CO sharing period, as follows:
- the CAP is performed based on channel sensing within a fixed sensing period of 25 μs when the gap is at least 25 μs;
- the CAP is performed based on channel sensing within a fixed sensing period of 16 μs when the gap is 16 μs; and
- the CAP is performed without channel sensing when the gap is less than 16 μs.

11. The method of claim 8, wherein the second SL transmission comprises physical sidelink control channel (PSCCH)/PSSCH.

12. The method of claim 8, wherein the second SL transmission comprises PSFCH.

13. The method of claim 8, wherein, when the condition is not satisfied, the CAP is performed based on the random backoff.

14. The method of claim 8, wherein the wireless communication system comprises a 3rd generation partnership project (3GPP) new radio (NR)-based wireless communication system.

* * * * *